United States Patent [19]

Bianchini, Jr. et al.

[11] Patent Number: 5,684,807
[45] Date of Patent: Nov. 4, 1997

[54] ADAPTIVE DISTRIBUTED SYSTEM AND METHOD FOR FAULT TOLERANCE

[75] Inventors: Ronald P. Bianchini, Jr.; Mark Stahl; Richard Buskens, all of Pittsburgh, Pa.

[73] Assignee: Carnegie Mellon University, Pittsburgh, Pa.

[21] Appl. No.: 495,871

[22] Filed: Jun. 28, 1995

Related U.S. Application Data

[63] Continuation of Ser. No. 907,856, Jul. 2, 1992, abandoned, which is a continuation-in-part of Ser. No. 679,446, Apr. 2, 1991, Pat. No. 5,325,518.

[51] Int. Cl.$^6$ ................................................. G06F 11/22
[52] U.S. Cl. ................................... 371/20.1; 395/182.02
[58] Field of Search ........................... 371/7, 9.1, 11.1, 371/11.3, 15.1, 16.1, 20.1, 20.2, 20.6; 395/182.02

[56] References Cited

U.S. PATENT DOCUMENTS

| | | | |
|---|---|---|---|
| 4,745,593 | 5/1988 | Stewart | 370/244 |
| 4,912,656 | 3/1990 | Cain et al. | 364/514 |
| 5,325,518 | 6/1994 | Bianchini, Jr. | 395/575 |

OTHER PUBLICATIONS

Ebihara, Y. et al., "Fault Diagnosis and Automatic Reconfiguration for a Ring Subsystem", *Computer Networks and ISDN Systems*, vol. 10, 1985, pp. 97–109.

Shombert, L. et al., "Using Redundancy for Concurrent Testing and Repairing of Systolic Arrays", *Fault Tolerant Computing Symposium*—17, 1987, pp. 244–249.

Choi, Y–H., "Distributed Diagnosis for Wafer Scale Systems", *Wafer Scale Integration, 1990 International Conf.*, 1990, pp. 189–195.

Choi, Y–H., "Distributed Diagnosis for Homogeneous Systems", *Computers and Communications, 1990 International Phoenix Conf.*, 1990, pp. 17–22.

Schoch, J. et al., "The 'Worm' Programs—Early Experience with a Distributed Computation", Communications of the ACM, vol. 25, No. 3, Mar. 1982, pp. 172–180.

Pradhan, D. et al., "A Fault–Tolerant Communication Architecture for Distributed Systems", IEEE Transactions on Computers, vol. C–31, No. 9, Sep. 1982, pp. 863–870.

Hosseini, S. et al., "A Diagnosis Algorithm for Distributed Computing Systems with Dynamic Failure and Repair", IEEE Transactions on Computers, vol. C–33, No. 3, Mar. 1984, pp. 223–233.

Armstrong, C., et al., "A Fault–tolerant Multimicroprocessor–based Computer System for Space–based Signal Processing", IEEE Micro, pp. 54–65, (Dec. 1984).

Hosseini, et al., "Distributed, Dynamic, and Efficient Testing of Large Scale Multiple Processor Systems," IEEE Parallel and Distributed Processing Proceedings, May 1990, pp. 208–214.

Somani, et al., "Distributed Diagnosis Algorithms for Regular Interrconnected Structures," IEEE Transactions on Computers, Jul. 1992, pp. 899–906.

U.S. patent application Ser. No. 08/409,535, filed Mar. 24, 1995, entitled Method for On–Line Diagnosis for Distributed Network Systems, by Bianchini.

*Primary Examiner*—Stephen M. Baker
*Attorney, Agent, or Firm*—Reed Smith Shaw & McClay

[57] ABSTRACT

An adaptive distributed diagnostic system and method for a network having at least a first, a second and a third nodes. Both the third and first nodes and the third and second nodes, respectively, are in communication with each other via the network. The first node can directly test a state of the third node and indirectly test through the third node a state of the second node. The second node can directly test a state of the third node and indirectly test through the third node a state of the first node. The third node can directly test both a state of the first node and a state of the second node. The third node has a testing assignment based on given circumstances at a corresponding time.

3 Claims, 18 Drawing Sheets

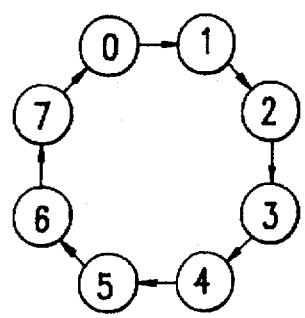
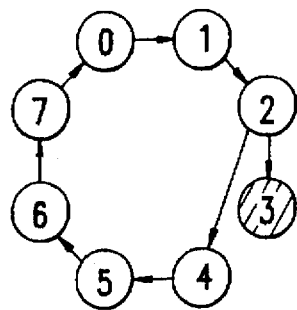
FIG.5(a)　　　FIG.5(b)
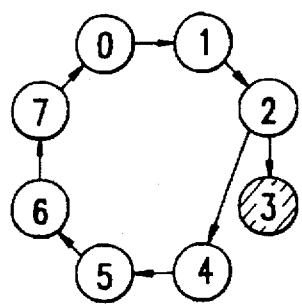
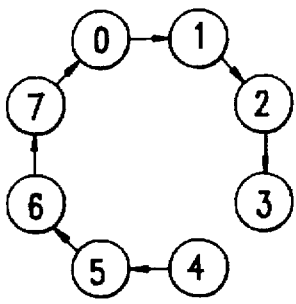
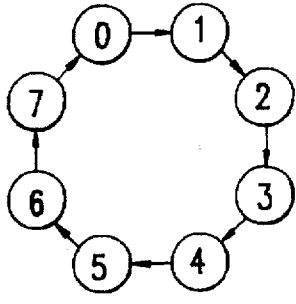
FIG.6(a)　　　FIG.6(b)　　　FIG.6(c)
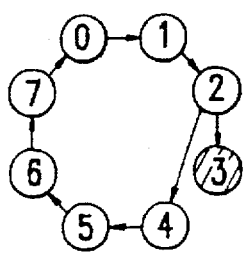
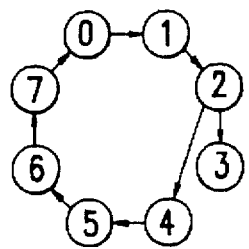
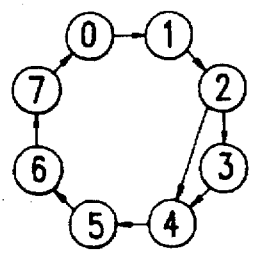
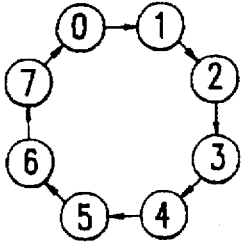
FIG.7(a)　FIG.7(b)　FIG.7(c)　FIG.7(d)

Timestamp ⎯⎯⎯⎯⎯⎯⎯  ⎯⎯Node/State
| | | |
|---|---|---|
| Syndromes[0]= | 10 | 1/0 |
| Syndromes[1]= | 9 | 0/0 2/0 |
| Syndromes[2]= | 4 | 3/0 |
| Syndromes[3]= | 7 | 1/0 4/1 |
| Syndromes[4]= | 3 | x/x |
Example Syndromes Array
FIG. 16A
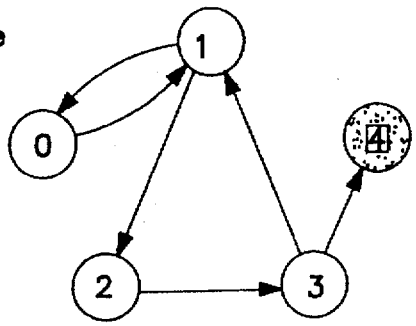
Associated Testing Assignment
FIG. 16B
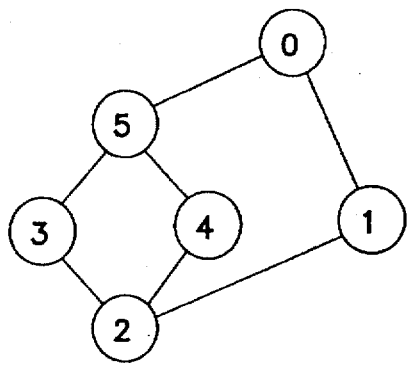
System Graph
FIG. 17A
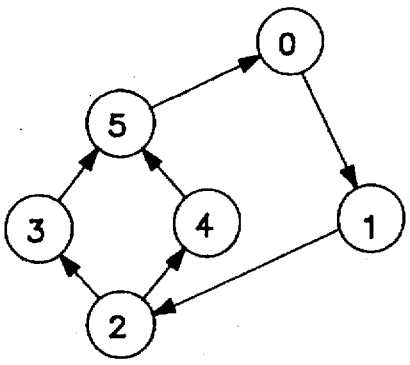
Initial Testing Assignment
FIG. 17B
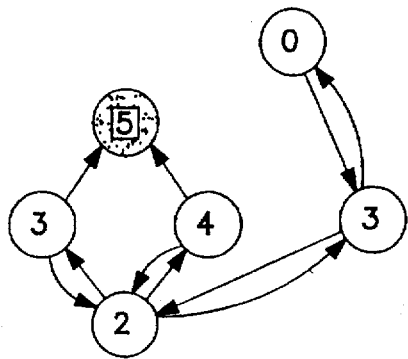
New Testing Graph
FIG. 18A
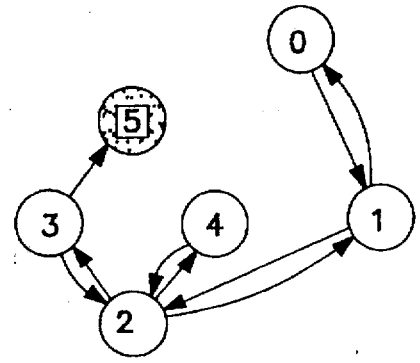
Reduced Testing Graph
FIG. 18B

ADAPTIVE DISTRIBUTED SYSTEM AND METHOD FOR FAULT TOLERANCE

CROSS REFERENCE TO OTHER APPLICATIONS

This is a continuation of U.S. patent application Ser. No. 07/907,856, filed Jul. 2, 1992, abandoned, which is a continuation-in-part of U.S. patent application Ser. No. 07/679,446, filed Apr. 2, 1991, now U.S. Pat. No. 5,325,518.

FIELD OF THE INVENTION

The present invention is related to system-level diagnosis. More specifically, the present invention is related to an adaptive distributed system and method for fault tolerance in fully connected networks and, in particular, to an adaptive distributed diagnostic system for general topographical networks.

BACKGROUND OF THE INVENTION

There has been a significant amount of research conducted in the field of system level diagnosis. Formal specifications for distributed diagnostics have been implemented in distributed system-level diagnosis. Adaptive algorithms permit nodes to modify their testing assignments to maintain diagnosis in the presence of faults within the network. Adaptive testing is achieved if a central node exists to collect all test results and determine the testing assignment. It is known that distributing the testing assignment based on locally maintained information is desirable. However, achieving such solutions has not proved easy.

The present invention involves new adaptive diagnosis algorithms, Adaptive DSD and Adapt, and their implementations. The framework of Adaptive DSD is modeled after the NEW_SELF distributed self-diagnosable algorithm given by Hosseini, Kuhl and Reddy; S. H. Kosseini, J. G. Kuhl and S. M. Reddy, "A Diagnosis Algorithm for Distributed Computing Systems with Dynamic Failure and Repair," *IEEE Transactions on Computers* C-33(3):223–233, March, 1984. In that work it is assumed that a node is capable of testing a fixed set of neighboring nodes. It is further assumed that fault-free nodes pass on results of these tests to other nodes in the network. No assumption is made about faulty nodes, which may distribute erroneous test results. Diagnostic messages containing test results flow between neighboring nodes and reach nonneighboring nodes through intermediate nodes. Each node determines independent diagnosis of the network utilizing the diagnostic messages it receives. The NEW_SELF algorithm was extended in R. P. Bianchini Jr., K. Goodwin and D. S. Nydick, "Practical Application and Implementation of Distributed System-Level Diagnosis Theory," *Proceedings of the Twentieth International Symposium on Fault-Tolerant Computing*, pages 332–339, IEEE, June, 1990, by addressing the resource limitations of actual distributed systems. This new algorithm, called EVENT_SELF, utilizes "event driven" diagnostic messages to reduce the resource overhead of the NEW_SELF algorithm.

The Adaptive DSD algorithm differs considerably from the SELF algorithms in that the testing structure is adaptive and determined by the fault situation. The algorithm handles node failures and repairs. Link failures are not considered in this implementation. The Adaptive DSD algorithm also differs from the SELF algorithms in that the number of nodes in the fault set is not bounded. While the SELF algorithms bound the number of allowable faulty nodes to a predefined limit t, in the Adaptive DSD algorithm, the fault set can include any number of nodes less than the total number of nodes. The remaining fault-free node will correctly diagnose all the other nodes as faulty.

The algorithm is optimal in terms of the total number of tests required. For correct diagnosis, each node must be tested by at least one fault-free node. In the Adaptive DSD algorithm each node is tested by exactly one fault-free node. Each node typically tests one other node, but can be required to test multiple nodes, of which one must be fault-free. In addition, the algorithm requires the maintenance of less complex data structures than do the SELF algorithms. All diagnostic information is contained in a single data structure stored at each node.

In Adapt, the algorithm provides distributed diagnosis by having. Bach fault-free node of the system formulate a local diagnosis for the entire system based on the results of tests it applies and the diagnostic information it receives from nodes it does not test directly. In this case, testing decisions are based on fault conditions in the network nodes and links. All testing decisions are determined locally at a node.

SUMMARY OF THE INVENTION

The present invention pertains to an adaptive distributed diagnosis system for fully-connected networks as well as for general topological networks. The invention comprises a network incorporating N nodes, where N is greater than or equal to 3 and is an integer, wherein a node is able to execute an algorithm in communication with the network. Each of the N nodes is in communication with at least one other node by way of the network. These connections may be arbitrary or fully connected. Each node has means for testing whether a node is in a desired state or an undesired state and for choosing which node to test based on given circumstances at a corresponding time.

The present invention also pertains to a method for determining whether N nodes of a network, where N is greater than or equal to 3 and is an integer, are in a desired or undesired state. The method comprises the step of testing with the tester node another node to determine whether the other node is in a desired state or undesired state. Next, there is the step of providing an activation signal to the node being tested if it is in a desired state to cause it to become the tester node. Then there is the step of repeating the above steps on another node at another predetermined location, if the node being tested is in an undesired state, until a node in a desired state is tested.

The methods of the present invention provide significant advantages over prior art diagnostic systems. These advantages will become apparent from a perusal of the accompanying drawings and the following detailed description of the presently preferred embodiments of two algorithms used in the invention together with modifications thereof.

BRIEF DESCRIPTION OF THE DRAWINGS

In the accompanying drawings, the preferred embodiments of the invention and preferred methods of practicing the invention are illustrated as follows:

FIGS. 5a and 5b are schematic representations of an event sequence for failing $N_3$.

FIGS. 6a, 6b, and 6c are schematic representations of a possible event sequence for repaired $N_3$.

FIGS. 7a, 7b, 7c, and 7d are schematic representations of a modified event sequence for repaired $N_3$.

FIGS. 16(a)–(b) are a node syndrome array and associated testing assignment for a five node network, respectively.

FIGS. 17(a)–(b) are a system graph of a network having six nodes and the initial testing assignment for those nodes, respectively.

FIGS. 18(a)–(b) are a system graph showing testing assignment for a six node network in which node $n_5$ has failed and a reduced testing graph.

FIGS. 21(a)–(b) illustrate the Adapt process on the network shown in FIG. 16.

FIGS. 23(c)–(f) illustrate a torus of 32 nodes.

DESCRIPTION OF THE PREFERRED EMBODIMENT

Figure 1A:
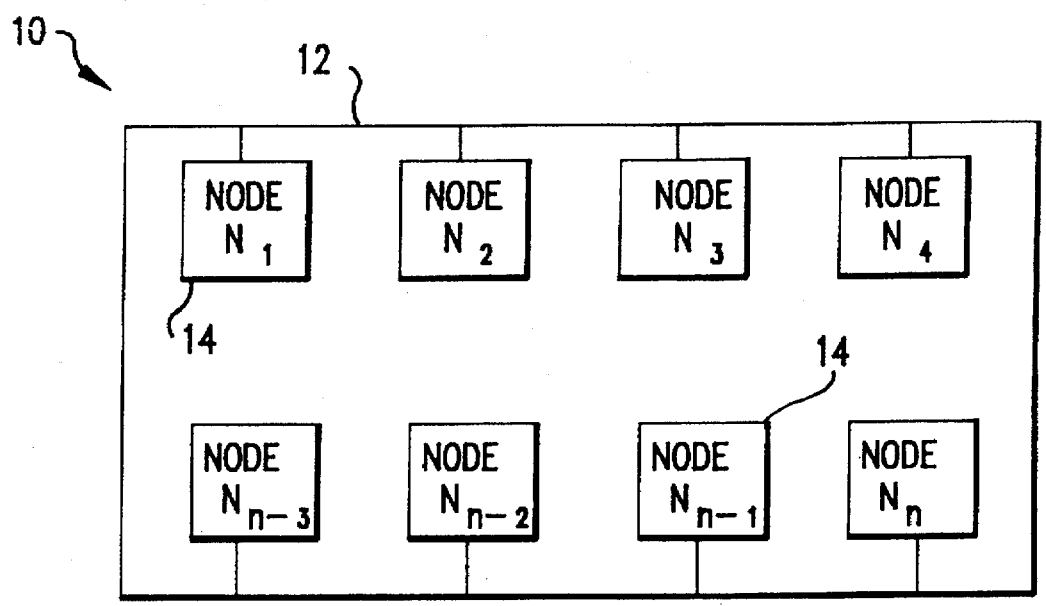
FIGS. 1a and 1b are block diagrams of an adaptive distributed system and method for fault tolerance.
Figure 1B:
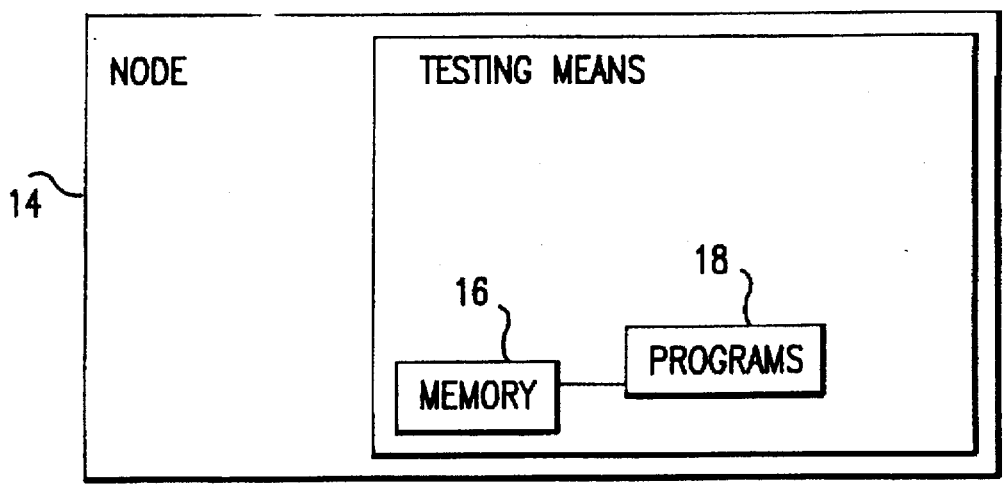
Figure 2:
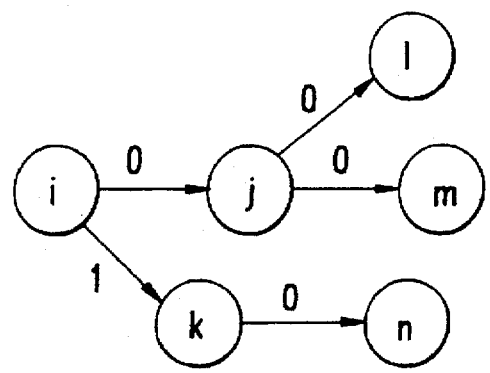
FIG. 2 is a schematic representation of forward fault-free paths from $N_i$.

1. Preferred Embodiment for a Fully Connected Network

Referring to FIGS. 1–15 of the drawings, wherein like reference numerals refer to similar or identical parts, there is depicted an adaptive distributed diagnostic system for a fully connected network, shown as a schematic representation of an adaptive distributed system 10 for fault tolerance. The system 10 is comprised of a network 12. The system 10 is also comprised of N nodes, which are preferably processors 14, where N is greater than or equal to 3 and is an integer and a node is able to execute an algorithm, in communication with the network 12. Each of the N processors 14 are in communication with at least one ether processor 14 by way of the network 12. Preferably, each processor 14 is in communication with every other processor 14. Each processor 14 has means for testing whether another processor 14 is in a desired state or an undesired state and for choosing which processor 14 to test based on given circumstances at a corresponding time. Preferably, the testing means tests another processor 14 and chooses which other processor 14 to test. A desired state can be, for example, that the processor is operating within the acceptable bounds of error, and an undesired state can be the processor is operating outside the bounds of acceptable error. Preferably, the testing means includes a memory 16. The testing means preferably also includes a computer program 20 stored in the memory 18. The computer program 20 chooses at least one other processor 14 to test, and also tests the other processor 14.

Preferably, the program 20 is comprised of the computer implemented steps of first testing whether another processor 14 at a predetermined position in the network 12 is in a desired state or an undesired state. Then there is the step of providing an activation signal to the processor 14 being tested if it is in a desired state to cause it to activate its computer program. Then, there can additionally be the step of providing a signal to the other processors 14 corresponding to the state of the processor 14 tested if it is in an undesired state. Next, there is the step of repeating the above steps on at least one other processor 14 at another predetermined location if the processor 14 tested is in an undesired state until a processor at a desired state is tested. It should be noted that from 1 to N of the processors 14 can be testing with the testing means the processors 14 of the network in parallel.

The first testing step can include the step of testing another processor 14 in the immediate clockwise location on the network 12 relative to the testing processor 14. The second testing step can also include the step of testing another processor 14 in the immediate clockwise location relative to the last processor 14 tested.

In general, a diagnosis system S consists of the vertices, edges and tests (V(S), E(S), T(S)), where:

$$V(S)=[n_0, n_1, 111, n_{N-1}]$$

The set of nodes or vertices of system S, where $n_i$ represents the i-th node of an N node distributed system, $0 \leq i \leq N-1$.

$$E(S)=[\ldots [n_i, n_j] \ldots ]$$

The set of edges of system S, where $[n_i, n_j]$ represents an undirected edge, or communication path between nodes $n_i$ and $n_j$. Initially, S is assumed to be fully edge connected, or $E(S)=E(K_N)$. It is shown below that the number of edges required in E(S) can be significantly reduced.

$$T(S)=[\ldots (n_i, n_j) \ldots ]$$

The set of tests of system S, where $(n_i, n_j)$ represents a directed edge, or test, from $n_i$ to $n_j$. Note that T(S) is a directed subset of E(S), such that if $(n_i, n_j) \in E(S)$.

Since T(S) is a directed subset of E(S), it is implied that if a node is able to test another node, then it can also communicate with that node. Previous work on distributed diagnosis fixes T(S) at system specification. In this work, T(S) is adaptive and varies at algorithm execution according to the fault situation. A fault situation F(S) defines the fault condition of the system:

$$F(S)=[s_0, s_1, \ldots, s_{N-1}]$$

The fault condition of system S, where $s_i$ is assigned one of [faulty, fault-free]. The variable $s_i$ represents the state of node $n_i$.

Test results are assumed to fall within the PMC or "symmetric invalidation" model of system diagnosis. F. P. Preparata, G. Metze and R. T. Chien, "On the Connection Assignment Problem of Diagnosable Systems," *IEEE Transactions on Electronic Computing* EC-16(12):848–854, December, 1967. In this model, the results of tests performed by fault-free nodes are accurate, and the results of tests performed by faulty nodes may not be accurate and can lead to erroneous results. Test results are one of (faulty, fault-free). For a node $n_x$ testing ny the test result equals $s_y$ if $n_x$ is fault-free. If $n_x$ is faulty, then the test result is arbitrary. The algorithm presented in S. H. Hosseini, J. G. Kuhl and S. M. Reddy, "A Diagnosis Algorithm for Distributed Computing Systems with Dynamic Failure and Repair," *IEEE Transactions on Computers* C-33(3):223–233, March, 1984, ensures information accuracy by restricting the flow of information between fault-free nodes. Specifically, a node will only accept information from other nodes that it tests and determines to be fault-free. As evident by this specification, valid diagnostic information flows between nodes in the reverse direction of tests between the nodes.

The algorithm presented herein utilizes the following testing scheme as described in S. H. Hosseini, J. G. Kuhl and S. M. Reddy, "A Diagnosis Algorithm for Distributed Computing Systems with Dynamic Failure and Repair," *IEEE Transactions on Computers* C-33(3):223–233, March, 1984:

1. $n_i$ tests $n_j$ as fault-free,
2. $n_i$ receives diagnostic information from $n_j$
3. $n_i$ tests $n_j$ as fault-free,
4. $n_i$ assumes the diagnostic information received in Step 2 is valid.

This scheme requires n to remain fault-free between the tests executed at Steps 1 and 3 above. The following assumption is required of a diagnosis system S for the above scheme to execute correctly:

Assumption: A node cannot fail and recover from that failure in an undetected fashion, during the interval between two tests by another node.

This can be accomplished by either recording and storing fault events until the second test occurs at Step 3 or by ensuring that the testing interval is small enough to detect all failures.

Given the above definitions and assumptions a node can successfully identify other fault-free nodes by utilizing forward paths of fault-free test results. See FIG. 2. Test results, identified by arcs, are labeled "0" if the result is fault-free and "1" if the result is faulty. Node $n_i$ tests both $n_j$ and $n_k$ and determines $n_j$ to be fault-free and $n_k$ to be faulty. Since $n_i$ determines $n_j$ to be fault-free, $n_i$ can utilize diagnostic information from $n_j$ which includes test results performed by $n_j$. Thus $n_i$ can correctly diagnose $n_l$ and $n_m$ as fault-free without directly testing those nodes. Since $n_i$ determines $n_k$ to be faulty, $n_i$ cannot diagnose the state of $n_n$. The algorithm presented below utilizes forward fault-free paths in this manner to identify fault-free nodes.

An example of the data structure required by the Adaptive DSD algorithm is shown in Table 1. The array TESTED_$UP_x$ is maintained at each node $n_x$. TESTED_$UP_x$ contains N elements, indexed by node identifier, i, as TESTED_$UP_x$ [i], for $0 \leq i$ N−1. Each element of TESTED_$UP_x$ contains a node identifier. The entry TESTED_$UP_x$[i]=j indicates that $n_x$ has received diagnostic information from a fault-free node specifying that $n_i$ has tested $n_j$ and found it to be fault-free. Table 1 shows the TESTED_$UP_2$ array maintained at $n_2$ for an eight node system with $n_1$, $n_4$, $n_5$ faulty. Note that "x" represents an entry that is arbitrary.

TABLE 1

Data Structure Maintained At Node $N_2$.

| |
|---|
| TESTED_UP2 [0] = 2 |
| TESTED_UP2 (1] = x |
| TESTED_UP2 [2] = 3 |
| TESTED_UP2 [3] = 6 |
| TESTED_UP2 [4] = x |
| TESTED_UP2 [5] = x |
| TESTED_UP2 [6] = 7 |
| TESTED_UP2 [7] = 0 |

The Adaptive DSD algorithm operates at each node by first identifying another unique fault-free node and then updating local diagnostic information with information from that node. Functionally, this is accomplished as follows. List the nodes in sequential order, as $(n_0, n_1, \ldots n_{N-1})$. Node $n_x$ identifies the next sequential fault-free node in the list. This is accomplished at nx by sequentially testing consecutive nodes $n_{x+1}$, $n_{x+2}$, etc., until a fault-free node is found. Diagnostic information received from the fault-free tested node is assumed to be valid and is utilized to update local information. All addition is modulo N so that the last fault-free node in the ordered list will identify the first fault-free node in the list.

TABLE 2

| The Adaptive DSD Algorithm. |
|---|
| /* ADAPTIVE_DSD */ |
| /* The following is executed at each $n_x$, $0 \leq x \leq N-1$ */ |
| /* at predefined testing intervals. */ |
| 1. y=x; |
| 2. repeat [ |
| 2.1. y=(y−1)mod[N]; |
| 2.2. request $n_y$ to forward TESTED_$UP_y$ to $n_x$; |
| 2.3. ] until ($n_x$ tests $n_y$ as "fault-free"); |
| 3. TESTED_$UP_x$[x]=y; |
| 4. for i=0 to N−1 |
| 4.1. if (i≠x) |
| 4.1.1. TESTED UP_$_x$[i] = TESTED_$UP_y$[i]; |

Table 2 presents the Adaptive DSD algorithm. The algorithm is executed at each node $n_x$ at predefined testing intervals. Instructions 1 and 2 identify ny as the first fault-free node after nx in the ordered node list. The test at Step 2.3 evaluates to "fault-free" if ny has remained fault-free since the last test by nx, including the period required for ny to forward TESTEDUP_$y$ in Step 2.2. This ensures that the diagnostic information included in TESTED-$UP_y$ received at Step 2.2 is accurate. Instructions 3 and 4 update the local diagnostic information dependent on both the fault-free test of $n_y$ and the diagnostic information received from $n_y$. Instruction 3 asserts TESTED_UP_[x]=y, which specifies that $n_x$ has tested ny and determined it to be fault-free. In Instruction 4, all other elements of TESTED_UPx are updated to the values of TESTED_UP Thus, the diagnostic information contained in the TESTED_UP arrays is forwarded between nodes in the reverse direction of tests. In this example, the information is forwarded from $n_y$ to $n_x$. Note that Step 4.1 prevents a node from replacing diagnostic information that it determines through normal testing procedures with information that it receives from other fault-free nodes.

Figure 3:
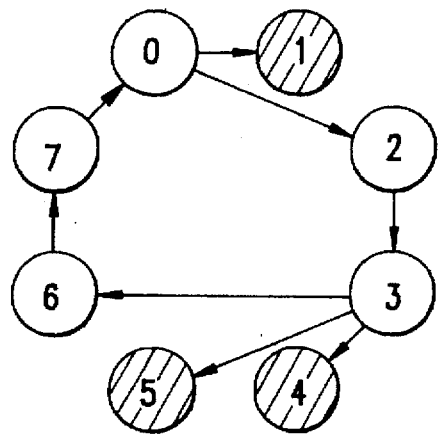
FIG. 3 is a schematic representation of an example system S and test set T(S).

Since $n_x$ continues testing nodes in Step 2 until a fault-free node is found, the test set T(S) is dependent on the fault situation, F(S). The test set T(S) of an example system of eight nodes is shown in FIG. 3. In the example, $n_1$, $n_4$ and $n_5$ are faulty. The Adaptive DSD algorithm specifies that a node sequentially tests consecutive nodes until a fault-free node is identified. For example, $n_0$ tests $n_1$, finds it to be faulty and continues testing. Subsequently, $n_0$ tests node $n_2$, finds it to be fault-free and stops testing. Node $n_2$ finds $n_3$ to be fault-free and stops testing immediately. Node $n_3$ must test three nodes before it tests a fault-free node. The TESTED_UP$_2$ array maintained at $n_2$ for this example is shown in Table 1.

Diagnosis is accomplished at any node by following the fault-free paths from that node to other fault-free nodes. The Diagnose algorithm to be executed by a node $n_x$ is given in Table 3. The algorithm utilizes the information stored in TESTED_UP$_x$ to determine its diagnosis of the system. Its results are stored in array STATE$_x$, where STATE$_x$[i] is one of [fault-free, faulty]. For correct diagnosis, STATE$_x$[i] must equal $s_i$ for all i. The Diagnose algorithm utilizes the fault-free entries of TESTED_UP$_x$ and operates as follows. Initially, all nodes are identified as faulty in Step 1. In Step 2, node_pointer is initially set to x, the identifier of the node executing Diagnose. Step 3 of the algorithm traverses the forward fault-free paths in T(S), labeling each of the nodes as fault-free. This accomplished by setting STATE$_x$[node_pointer] to fault-free and then, setting node_pointer to TESTED_UP$_x$[node_pointer], which identifies the next sequential fault-free node in V(S). Step 3 is continued until node_pointer is set to every fault-free node and returns to x.

TABLE 3

| The Diagnose Algorithm. |  |
|---|---|
| | /* DIAGNOSE */ |
| | /* The following is executed at each $n_x$, |
| | $0 \leq X \leq N-1$ */ |
| | /* when $n_x$ desires diagnosis of the system. */ |
| 1. | for i=0 to N−1 |
| 1.1. | STATE$_x$[i]=faulty; |
| 2. | node_pointer=x; |
| 3. | repeat |
| 3.1. | STATE$_x$[node_pointer]=fault free; |
| 3.2. | node_pointer TESTED_UP$_x$ [node_pointer]; |
| 3.3. | ] until (node_pointer=x); |

The Adaptive DSD algorithm represents considerable improvements over previous distributed diagnosis algorithms in terms of diagnosability and the number of tests required. The Adaptive DSD algorithm requires N tests and is optimal since each node must be tested by one fault-free node. In addition, all fault sets can be diagnosed, including up to N−1 faulty nodes. The remaining fault-free nodes can always form a directed cycle of fault-free tests, and thus can identify all fault-free nodes. The SELF algorithms [6,1] require Nt tests to diagnose all possible fault sets including at most t faulty nodes.

Figure 4:
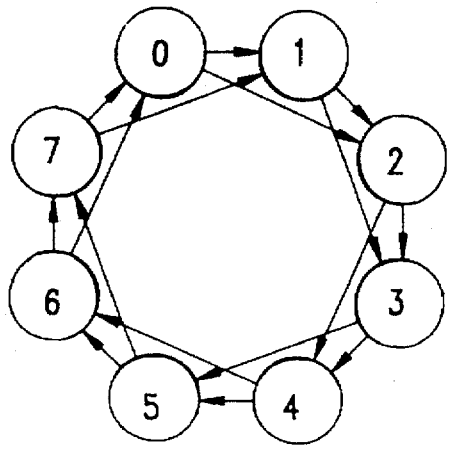
FIG. 4 is a schematic representation of an example system S consisting of eight nodes with $T(S)=D_{1,i+1}$.

Other work in system-level diagnosis, E. Kreutzer and S. L. Hakimi, "System-Level Fault Diagnosis: A Survey," *Euromicro Journal* 20(4,5):323–330, May, 1987 and distributed diagnosis, S. H. Hosseini, J. G. Kuhl and S. M. Reddy, "A Diagnosis Algorithm for Distributed Computing Systems with Dynamic Failure and Repair," *IEEE Transactions on Computers* C-33(3):223–233, March, 1984, assumes a bound on the total number of faulty nodes. Consider a system S of N nodes, at most t<N of which are faulty. In Adaptive DSD, each node sequentially tests consecutive nodes until a fault-free node is identified. If at most t nodes can be faulty, then any node will test at most t+1 nodes to find a fault-free node. FIG. 4 illustrates the graph $D_{1,2}$ presented in F. P. Preparata, G. Metze and R. T. Chien, "On the Connection Assignment Problem of Diagnosable Systems" *IEEE Transactions on Electronic Computing* EC-16 (12):848–854, December, 1967, which consists of eight nodes and two forward arcs from each node to the next two sequential nodes. In Section 3.2, it is proven that if a system S is fully connected, i.e. E(S)=E(K$_N$), then Adaptive DSD can diagnose N−1 failures. Given that at most t nodes can be faulty, the testing topology, T(S), of system S will always be a subset of $D_{1,t+1}$. Thus, the E(S)=E(K$_N$) requirement can be reduced to $D_{1,t+1}$ with non-directed edges, or E(S)=E(H$^{m,n}$) as shown in J. A. Bondy and U. S. R. Murty, *Graph Theory and Applications*, Elsevier North Holland, Inc., New York, N.Y., 1976, where m=N and n=t+1. Thus, for a system with N nodes and at most t failures, the communication topology, E(S), must include E(H$_{N,t+1}$), i.e, E(H$_{N,t+1}$)≦E(S)

Previous work in adaptive system-level diagnosis, E. Schmeichel, S. L. Hakimi, M. Otsuka and G. Sullivan, "A Parallel Fault Identification Algorithm," *Journal of Algorithms* ([All), June 1990; S. L. Hakimi and E. F. Schmeichel, "An Adaptive Algorithm for System Level Diagnosis," *Journal of Algorithms* (5), June, 1984, assumes that an external observer desires the diagnosis of the network. The observer is unable to test the nodes of the system, but can request the outcome of test results. Typically, the observer first identifies a single fault-free node, and then utilizes that node to determine the state of the remaining nodes. An algorithm can be specified for the central observer that models the distributed Adaptive DSD algorithm. The algorithm specifies that each node sequentially test consecutive nodes until it finds a fault-free node. If any node determines the subsequent t nodes to be faulty, the observer assumes that the test of the next node will be fault-free. At completion, the largest cycle consisting of fault-free tests contains all of the fault-free nodes. This algorithm requires no more than N+Ft tests, where t is the maximum number of faults permitted and N is the number of nodes, of which F are faulty. This is shown since each node is tested once by a fault-free node and each faulty node can test up to t nodes each.

In addition, testing is specified to occur in rounds, allowing a node to either test or be tested in a single round. The tests required in a given round are adaptively chosen utilizing the test results from previous rounds. The Adaptive DSD testing scheme can be specified in "testing stages" where each node is allowed to test and be tested in a single stage. In stage i, $1 \leq i \leq t$, each $n_x$ tests $n_{x+1}$ if all previous test results reported by $n_x$ were faulty. This algorithm requires at most t testing stages. Since the testing topology specified in each stage is a directed cycle, each stage can be specified in at most 3 rounds. They are the even cycle edges; the odd cycle edges; and the last edge, if an odd cycle. Thus, the number of testing rounds is at most 3t.

The Adaptive DSD algorithm is optimal in terms of the total number of tests required. Several implementation enhancements are presented herein to reduce other algorithm resource requirements and increase performance. The first enhancement addresses the transient behavior of the algorithm. Although the algorithm is guaranteed to converge to the correct diagnosis, incorrect transient diagnosis is possible during the convergence period due to delays in real systems. The enhancement ensures correct transient diagnosis during the convergence period by the addition of a temporary extra test for each node whose state changes from faulty to fault-free. The second enhancement concerns nontest related communication overhead. Diagnostic information can be reduced for nodes whose state changes infrequently. The third enhancement concerns diagnosis latency, or the time required for the nodes to reach a correct diagnosis after a fault event. In this scheme, internode communication and tests are driven by system fault events, in addition to periodic tests. Finally, asymmetric information forwarding is presented to further reduce diagnosis latency.

The Adaptive DSD algorithm yields provably correct diagnosis after N testing rounds following a fault event. However, correct diagnosis is not guaranteed during the N testing rounds immediately following the fault event. The problem occurs when faulty nodes are repaired and become fault-free. The newly repaired node requires a finite period to identify a single fault-free node, during which the node reports invalid diagnostic information. This situation is identified by a break in the testing cycle in T(S). This problem is aggravated in actual systems where the newly repaired node requires an appreciable amount of time to identify a fault-free node.

FIG. 5 illustrates a node failure sequence. In FIG. 5a, all system nodes are fault-free. Node $n_3$ fails in FIG. 5b. Node $n_2$ then begins testing $n_4$. The cycle of fault-free nodes is maintained, and the diagnostic information remains valid.

FIG. 6 illustrates a node repair sequence that exhibits incorrect transient diagnosis. Node $n_3$ is faulty in FIG. 6a, requiring $n_2$ to test $n_3$ and $n_4$. Node $n_2$ detects that $n_3$ is repaired in FIG. 6b and begins testing only $n_3$. However, if $n_3$ has not yet tested n4 then TESTED_UP$_3$ is invalid. This causes a break in the testing cycle T(S). Since the Diagnose algorithm follows fault-free paths in T(S) it will determine an incorrect diagnosis of the fault situation. In FIG. 6c, $n_3$ determines $n_4$ to be fault-free, thus restoring the testing cycle in T(S). At this time, the Diagnose algorithm correctly diagnoses the fault situation. This problem is avoided by requiring additional temporary tests by the Adaptive DSD algorithm.

Examine the fault event sequence in FIG. 7. Node $n_3$ is faulty in FIG. 7a and repaired in FIG. 7b. As shown, $n_2$ continues to test both $n_3$ and $n_4$ until information is received by $n_2$ that $n_3$ tests $n_4$. During this time, $n_2$ reports both nodes to be fault-free by specifying TESTED_UP$_2$[2]=[3 4]. In FIG. 7c, $n_3$ begins testing $n_4$ and receives valid diagnostic information. Subsequently, as shown in FIG. 7d, $n_2$ can stop testing $n_4$ and reports TESTED_UP$_2$[2]=[3]. A cycle is maintained in T(S) for the entire fault event sequence shown in FIG. 7. Thus Diagnose correctly diagnoses the fault condition of the system at any instance during the sequence.

This feature requires modification to both the Adaptive DSD and Diagnose algorithms. Adaptive DSD is modified to accept a list of node identifiers for each entry of the TESTED_UP array. In addition, Adaptive DSD executed at $n_i$ is modified to initialize TESTED_UP$_i$[i] to i at program initialization to identify that $n_i$ can only indicate itself as fault-free. The Diagnose algorithm is rewritten as a recursive function at Step 3.2 so that node_pointer is set to all of the entries in the TESTED UP array. Step 3.3 is rewritten to identify either node_pointer=x, or TESTED_UP$_i$[i]=i as terminating conditions.

Although the Adaptive DSD algorithm is optimal in terms of test count, it requires more than the minimum number of diagnostic messages. After two testing rounds of Adaptive DSD, TESTED_UP$_w$[x]=y. The value remains constant for testing rounds 3 through N. However, $n_w$ receives TESTED_UP$_x$[x]=y from $n_x$ for testing rounds 3 through N and uses it to update TESTED_UP$_w$[x] to the same value. In real systems, it is wasteful to utilize network resources to communicate duplicated information between nodes. A time stamping scheme like that presented in R. P. Bianchini Jr., K. Goodwin and D. S. Nydick, "Practical Application and Implementation of Distributed System-Level Diagnosis Theory," *Proceedings of the Twentieth International Symposium on Fault-Tolerant Computing*, pages 332–339, IEEE, June, 1990, is employed to permit nodes to transfer new diagnosis information only during Step 2.2 of Adaptive DSD. The total message count is minimized using this scheme. Each node receives a single message for every change in TESTED_UP, making the message count both minimal.

Each node, $n_x$, maintains a local time stamp, $ts_x$. Adaptive DSD records the time stamp at each entry of TESTED_UP$_x$. Assume a new entry arrives to be inserted into TESTED_UP$_x$[y]. Then $ts_x$ is incremented and recorded with the new TESTED_UP$_x$[y]. When $n_w$ requests diagnostic information from $n_x$, it sends $ts'_x$ representing the time stamp at $n_x$ when $n_w$ last requested to be updated. Node $n_x$ simply forwards the entries of TESTED_UP$_x$ that have time stamps larger that $rs'_x$. Examine the following testing sequence example:

1. $n_i$ tests $n_j$ as fault-free,
2. $n_i$ sends request ($ts_j$=0) to $n_j$,
   $n_i$ receives $ts_j$=20 and entire TESTEDUP$_j$.
3. $n_i$ tests $n_j$ as fault-free, assumes above information valid.
4. $n_i$ sends request($ts_j$=20) to $n_j$, $n_i$ receives $ts_j$=30 and TESTED_UP$_j$ modified since $ts_j$=20.
5. $n_i$ tests $n_j$ as fault-free,
   $n_i$ assumes above information valid.

The first time $n_i$ requests information from $n_j$ in Step 2, it forwards $ts_j$=0. This ensures that $n_j$ forwards every entry of TESTED-UP$_j$. Node $n_j$ returns its current time stamp, $ts_j$=20. The second time $n_i$ requests information from $n_j$ in Step 4, it forwards $ts_j$=20. Node $n_j$ forwards all entries in TESTED-UP$_j$ that have time stamps greater than 20, and returns the current $ts_j$=30. In this manner, only new diagnostic information is forwarded from $n_j$ to $n_i$. A scheme is employed as shown in S. H. Hosseini, J. G. Kuhl and S. M. Reddy, "A Diagnosis Algorithm for Distributed Computing Systems with Dynamic Failure and Repair," *IEEE Transactions on Computers* C-33(3):223–233, March, 1984, to ensure that the time stamps do not grow unbounded.

This enhancement addresses the diagnosis latency of the algorithm and assumes the information updating enhancement. When a new diagnostic message arrives at $n_x$, $n_x$ stores the message in TESTED_UP$_x$. At this time, $n_x$ can determine correct diagnosis. Currently, the new information is not forwarded until a request for the information arrives from another node. However, if $n_x$ can identify the node that the message will be forwarded to, it can forward the message when it arrives. This scheme is termed Event Driven since information is forwarded when the event occurs. In the previous algorithm, information is forwarded only on request.

Event Driven Adaptive DSD is implemented by adding a new array FORWARD_TO$_x$. New information arriving at $n_x$ is forwarded to all the nodes in FORWARD_TO$_x$. Upon receiving the new information, these nodes immediately test $n_x$ to validate it.

The number of messages remains the same as in the information updating scheme; however, diagnosis latency is reduced. In the previous algorithms, new information is stored at each node until other nodes request the diagnostic information. In this algorithm, the new information is forwarded immediately. A detailed analysis of the diagnosis latency is given below.

Figure 8A:
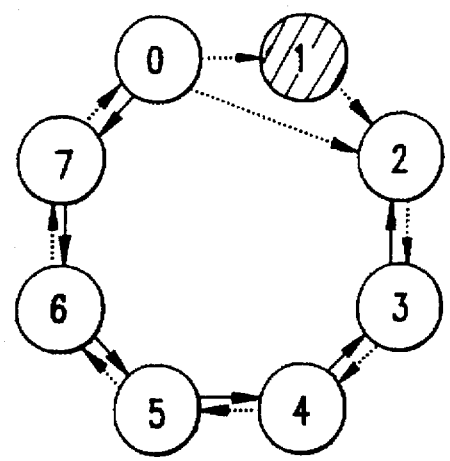
FIGS. 8a, 8b, and 8c are schematic representations of different information forwarding schemes.

Asymmetric information forwarding further reduces the diagnosis latency by forwarding diagnosis information along redundant communication paths, different from those utilized for testing. Different information forwarding schemes are illustrated in FIG. 8. Tests are identified by shaded arcs and diagnostic information is forwarded along solid arcs. The original Adaptive DSD algorithm is illustrated in FIG. 8a. Diagnosis information is forwarded only in the reverse direction of the system tests. In the figure, n0 tests n1 and detects it to have failed. Subsequently, $n_0$ tests $n_2$, determines it to be fault-free, then forwards that diagnostic information along the solid arc to n7. The diagnostic information traverses six arcs before it reaches n2.

Figure 8B:
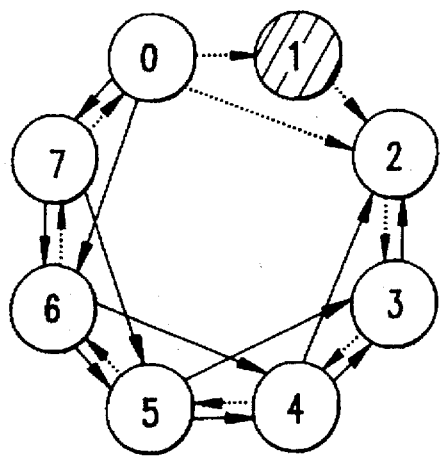
Figure 8C:
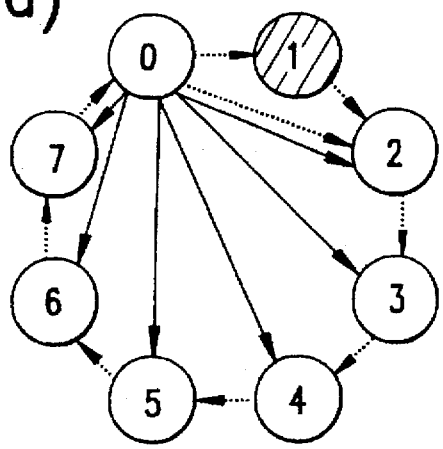

The different information forwarding schemes illustrated in FIG. 8 optimize different system parameters. Three forwarding schemes are illustrated for the event of n0 detecting n1 as faulty. FIG. 8a, as presented above, illustrates symmetric forwarding. This scheme requires the lowest number of diagnosis information messages to be forwarded from each node and provides the highest diagnosis latency. The forwarding scheme utilized by the SELF algorithms is illustrated in FIG. 8b. Each node forwards diagnosis information to t other nodes. The scheme illustrated in FIG. 8c requires a high message count at $n_0$ but has the minimum diagnosis latency of one message delay.

Figure 9:
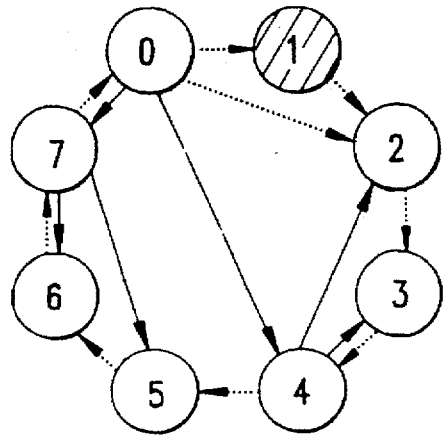
FIG. 9 is a schematic representation of an asymmetric information forwarding scheme for faulted $N_1$.

The asymmetric information forwarding scheme utilized in the final implementation of Adaptive DSD is illustrated in FIG. 9. Using this scheme, $n_0$ forwards the diagnostic information to $n_4$ and $n_7$. Nodes $n_4$ and $n_7$ each forward the information to two additional nodes. In this implementation, the information forwarded along the solid arcs requires only two arcs to reach $n_2$. The structure represented by the solid arcs is a binary tree. The longest path in a binary tree is log2N. A binary tree is chosen as the forwarding-structure since it requires that half of the nodes forward only one additional diagnostic message, yet reduces the path length a diagnostic message must travel from N to log2N.

Table 4 classifies recent distributed system diagnosis algorithms. The algorithms are classified by two orthogonal characteristics. The columns distinguish between adaptive and non-adaptive algorithms. Column A identifies non-adaptive algorithms and Column B identifies the adaptive algorithms specified herein. The rows identify the diagnostic information handling scheme employed by the algorithms. Row 1 identifies algorithms that forward all diagnostic information in every algorithm testing round. Row 2 identifies algorithms that only forward information that has changed since the previous testing round. Row 3 identifies the most complicated information handling scheme, which involves using fault events to forward information rather than testing rounds. The algorithm identified in Row 4 forwards diagnosis information along different communication paths than those utilized for testing.

TABLE 4

Distributed System Diagnosis Algorithm Classification.

| | Algorithm Classification | |
|---|---|---|
| | A. Non-Adaptive | B. Adaptive |
| 1. All Diagnosis Information | NEW_SELF | Adaptive DSD |
| 2. Diagnosis Information | (none) | Adaptive DSD W/Update |

TABLE 4-continued

Distributed System Diagnosis Algorithm Classification.

| | Algorithm Classification | |
|---|---|---|
| | A. Non-Adaptive | B. Adaptive |
| Updating | | |
| 3. Event Driven Diagnosis Information | EVENT_SELF | Event Driven Adaptive DSD |
| 4. Asymmetric Diagnosis Information Forwarding | (none) | Asymmetric Event Driven Adaptive DSD |

Table 5(a) shows the diagnosability of the algorithms. Algorithm diagnosability is the maximum number of faulty nodes that are permitted for the algorithm to maintain correct diagnosis. The diagnosability of the SELF algorithms is predefined before algorithm execution, and is t. The testing topology is fixed prior to algorithm execution and is determined by t. The diagnosability of the Adaptive DSD algorithms is N–1, which specifies that any set of faulty nodes is acceptable. The remaining fault-free nodes will always determine correct diagnosis.

TABLE 5

Algorithm Diagnosability and Test Count.

| | SELF Algorithms | Adaptive DSD |
|---|---|---|
| Algorithm Diagnosability | | |
| All Information Forwarding Schemes | t | N–1 |
| (a) | | |
| Test count Per Testing Round | | |
| All Information Forwarding Schemes | Nt | N |
| (b) | | |

Table 5(b) shows the number of tests required by each algorithm. The SELF algorithms require Nt tests since each node must be tested by t other nodes. The Adaptive algorithms require N tests. Since every node of any distributed diagnosis system must be tested by one of the fault-free nodes, N is the minimum number of tests possible. Thus, Adaptive DSD is optimal in terms of the number of tests required.

Table 6 identifies the number of messages that contain algorithm diagnostic information. In the SELF algorithms, each message contains the triple, (A, B, C), where A, B, and C are node identifiers. The Adaptive DSD algorithm requires that each TESTED_UP array gets forwarded in a testing round. Thus N messages of size N are required and recorded as N2 in Table 6. The message counts of the event driven and information updating schemes are functions of the number of fault events. Identify f as the number of faulty nodes, and Δf as the change in the number of faulty nodes, or fault events. Adaptive DSD with information updating forwards each Δf fault event to each node, thus the total message count is NΔf. The message count is optimal since each node must receive at least one message for each fault event. This message count is the same for Event Driven Adaptive DSD. The asymmetric forwarding algorithm requires 1.5NΔf messages since it forwards diagnosis information along redundant paths.

TABLE 6

Algorithm Message Count.
Message Count Per Testing Round

|  | SELF Algorithms | Adaptive DSD |
| --- | --- | --- |
| All Information | $O(N^2t^2)$ | $N_2$ |
| Information Updating | — | $N\Delta f$ |
| Event Driven | $O(N\Delta ft^2)$ | $N\Delta f$ |
| Asymmetric Forwarding | — | $1.5N\Delta f$ |

Table 7 identifies the diagnosis latency of each algorithm. The diagnosis latency is the time required for all fault-free nodes in the diagnosis system to reach a correct diagnosis after a fault event. Adaptive DSD requires N testing rounds to get new diagnostic information to every node. Thus, the diagnosis latency is $N(T_r)$, where $T_r$ represents the time of a testing round. The SELF algorithms require $N/_t+1$ testing rounds since there are multiple paths between nodes in the test set, including paths of length $N/_t+1$. The diagnostic messages require less time to be forwarded to all nodes in the system.

TABLE 7

Algorithm Diagnosis Latency.
Worst Case Diagnosis Latency

|  | SELF Algorithms | Adaptive DSD |
| --- | --- | --- |
| All Information | $N/_t+1$ $(T_r)$ | $N$ $(T_r)$ |
| Information Updating | — | $N$ $(T_r)$ |
| Event Driven | $N/_t+1$ $(T_{test})$ | $N$ $(T_{test})$ |
| Asymmetric Forwarding | — | $\log_2 N$ $(T_{test})$ |

The event driven algorithms have significantly reduced diagnosis latency. In the nonevent driven algorithms, the diagnostic information arrives at a node and is not forwarded until the information is requested during the next testing round. In the event driven schemes, the node receiving the information immediately validates it by testing the node that forwarded the information. Once validated, the information is immediately forwarded to subsequent nodes. Thus, the information is forwarded after the time required for a fault-free test, $T_{test}$, which is significantly less than a testing cycle in our implementation. The asymmetric adaptive algorithm further reduces diagnosis latency by utilizing redundant shorter paths, the longest of which contains $\log_2 N$ nodes.

In the operation of the preferred embodiment, Adaptive DSD has been running in the CMU ECE department since November 1990 on various workstations using the Ultrix operating system, including VAX and DEC 3100 RISC workstations. The algorithm consists of approximately 3000 lines of C code, written in modular form to make it easily portable. The network interface for this implementation uses the Berkeley socket interface; *UNIX Programmer's Manual: Socket* The University of California at Berkeley, 1986, and presently supports Ethernet IP/UDP protocols, *The Ethernet: A Local Area Network* 2.0 edition, Digital Equipment Corp., Intel Corp., Xerox Corp., 1982 (Data Link Layer and Physical Layer Specifications); J. B. Postel, Internet Protocol, Technical Report, NSF-Net RFC #791, September 1981. Appropriate modifications to the network module will allow the program to run on any system that has a C compiler.

Adaptive DSD, like its predecessor EVENT_SELF, R. P. Bianchini Jr., K. Goodwin and D. S. Nydick, "Practical Application and Implementation of Distributed System-Level Diagnosis Theory," *Proceedings of the Twentieth International Symposium on Fault-Tolerant Computing,* pages 332–339, IEEE, June, 1990, is implemented as a modular, event-driven program. A configuration file is read by each workstation at start-up that identifies the complete list of workstations participating in system diagnosis, as well as specifying a number of tuning parameters. Algorithm tuning parameters include the maximum number of forward tests in a single test interval, various time-out values, and flags that enable or disable certain options, such as packet bundling. An activity scheduler plays a significant role in the implementation by permitting events such as workstation tests, packet retransmissions, and other time-outs to be scheduled for execution at a specified time. As with EVENT_SELF, the workstation test is implemented as a separate program that is spawned as a subprocess to test several of the hardware facilities of the workstation.

Workstations participating in system diagnosis are initially sorted by Internet host address. Since this number is unique to each workstation, all workstations generate identical sorted lists. Testing occurs only in the forward direction of the sorted list; i.e. each workstation tests those workstations that follow it in the sorted list, modulo the number of workstations. Information forwarding occurs only in the reverse direction, or backwards in the sorted list. Due to Internet standard subnet routing, J. C. Mogul, J. B. Postel, *Internet Standard Subnetting Procedure*, Technical Report, NSF-Net RFC #950, August, 1985, workstations with numerically similar host addresses will be located on a single subnet. The sorted arrangement of workstations tends to minimize the load on routers and bridges as a result of inter-subnet communication.

The initial start-up of Adaptive DSD is a source of concern. Each node attempts to find and maintain a cycle among all other fault-free nodes. The first node started essentially tests every other node in the network searching for a fault-free node. There are several approaches to reduce the number of tests in this situation. The first permits the node to test every other node in the network. This provides rapid diagnosis convergence during start-up, but results in unmanageable message traffic, especially when a large number of nodes are involved. An alternate approach is to have each node test one node in a test interval in sequence, until it finds a fault-free node. This approach results in slow diagnosis convergence, since a large number of testing intervals might be required for each node to find a fault-free node. The strategy employed is compromise of these two approaches. Each node tests a subset of the total number of nodes in the network per testing interval. If a maximum of m nodes can be tested in each test interval, then a fault-free cycle must be found in at most $N/_m$ test intervals. This approach limits total algorithm communication to Nm tests per testing interval. The algorithm operation in the presence of many faulty nodes permits graceful degradation of diagnosis latency. If more than m consecutive nodes are faulty, only m of them will be tested per test interval.

Operation of the Adaptive DSD algorithm on the CMU ECE network focused on algorithm communication overhead, in terms of average packet count, and diagnosis latency, measured in seconds. FIGS. 10–15 graph the communication overhead as a function of experiment elapsed time. In addition, important events are marked, including fault occurrence and diagnosis.

Figure 10:
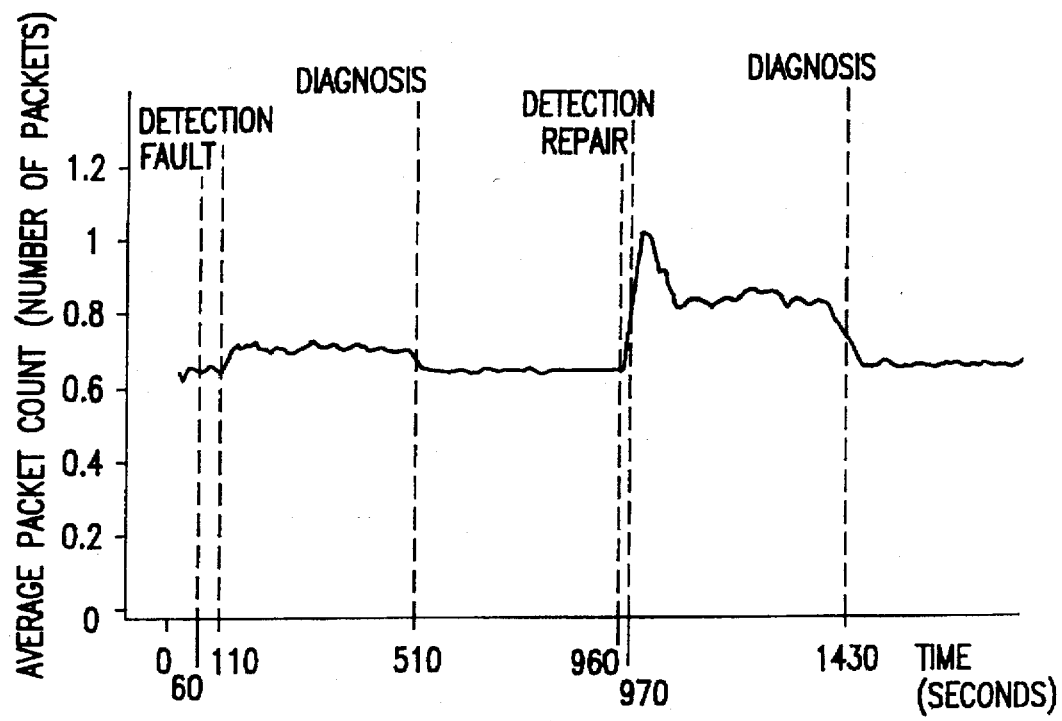
FIG. 10 is a graph depicting Scenario 1 on a 72-node testing network.
Figure 11:
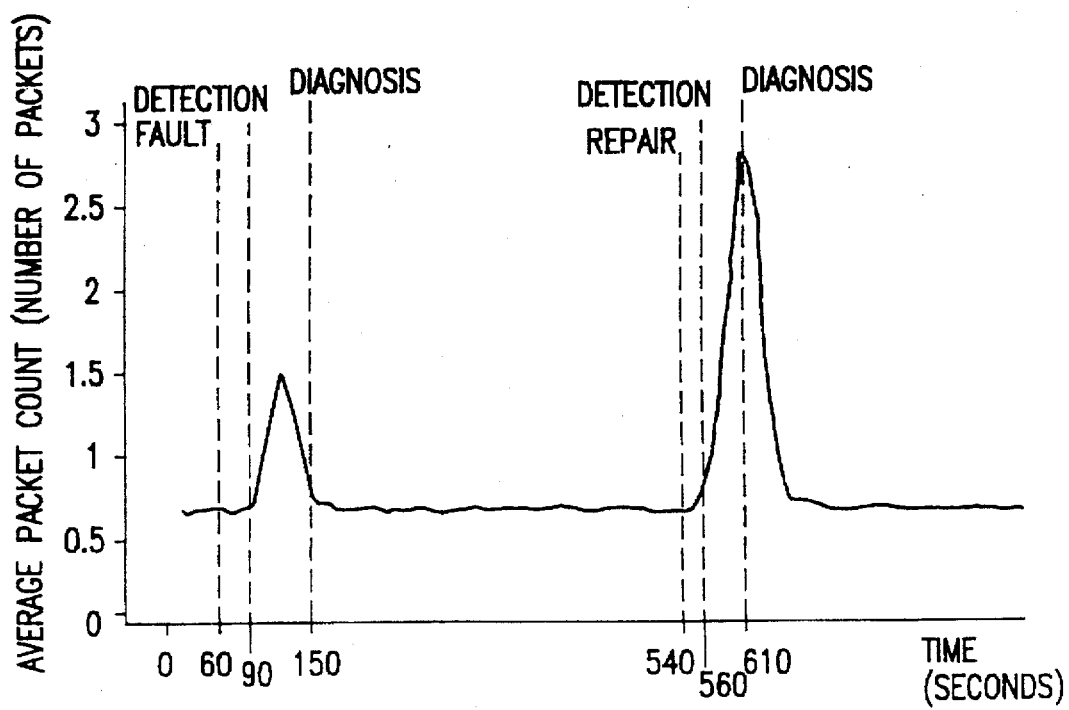
FIG. 11 is a graph depicting Scenario 2 on a 60-node testing network.
Figure 12:
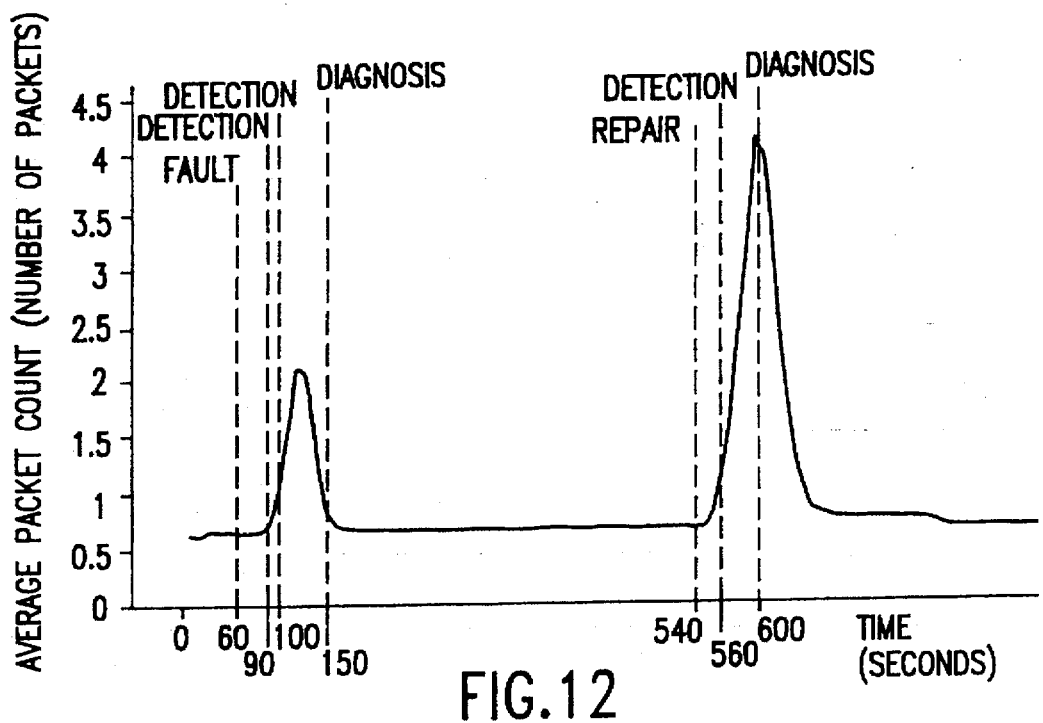
FIG. 12 is a graph depicting Scenario 3 on a 60-node testing network.
Figure 13:
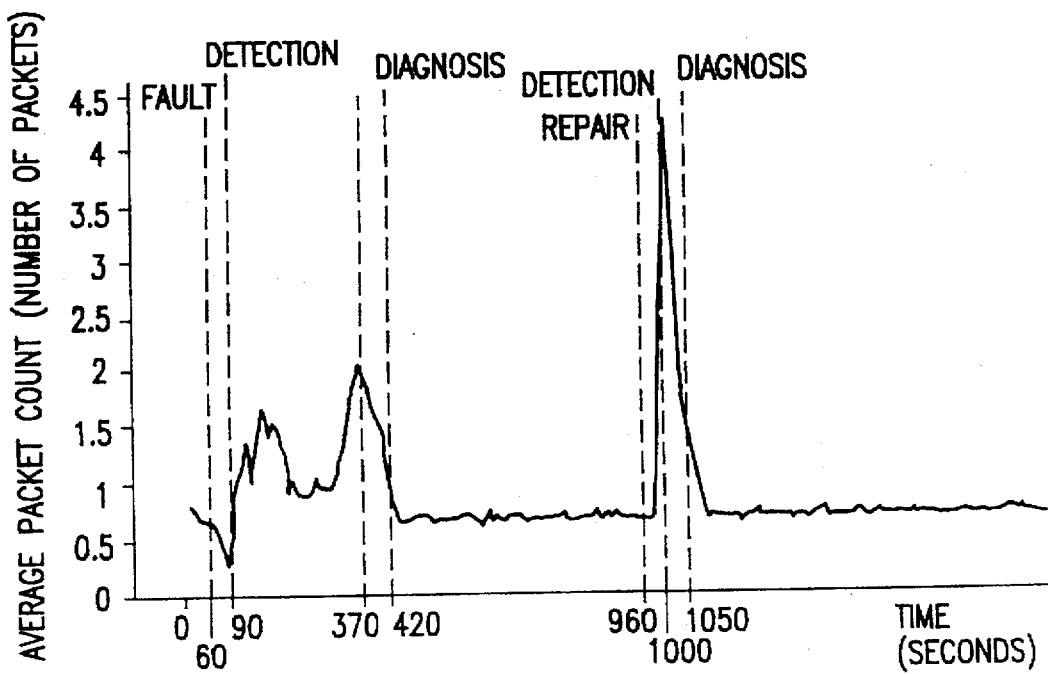
FIG. 13 is a graph depicting Scenario 4 on a 60-node testing network.

FIG. 10 illustrates the execution of the Adaptive DSD algorithm with symmetric information forwarding. FIGS. 11–13 illustrate the performance of the Adaptive DSD algorithm with asymmetric forwarding. In each scenario, the diagnosis system consists of 60 nodes and the algorithm executes with a 30 second test interval. Packet bundling is employed. To reduce the amount of message traffic generated by a node returning to the network from a failure, a maximum of m=5 forward tests per test interval are permitted. Every node maintains its own data collection for the packet counts shown in the figures, which is collected at ten-second intervals throughout each experiment.

Scenarios 1 and 2 demonstrate the difference between symmetric and asymmetric forwarding. See FIGS. 10 And 11. Both experiments involve the failure and subsequent recovery of a single node. Symmetric forwarding is utilized in Scenario 1 and asymmetric forwarding is utilized in Scenario 2. At 60 seconds during Scenario 1, a single node in the network fails. The faulted node is detected at 110 seconds, after it is tested and a test time-out period occurs. After 110 seconds, the fault information is forwarded to the remaining fault-free nodes. Since diagnosis information is validated by testing, the fault information will reach the farthest node from the failure only after all nodes between it and the fault are tested and found to be fault-free. Thus, at time 510, the node farthest from the fault receives the information indicating the node failure. This results in an overall diagnosis latency of 450 seconds. After the failure is detected, the detecting node begins testing the nodes that the faulty node tested before its failure.

At 960 seconds the faulty node is repaired and returns to the network. The newly recovered node immediately performs forward tests up to the limit of five, as specified in the configuration file. This causes the sharp increase in packet count at time 960. At time 970, the recovered node is detected. This information is propagated backward through the path of fault-free nodes until it reaches the fault-free node farthest from the recovered node, at 1430 seconds. Correct diagnosis is achieved within 460 seconds. After 1430 seconds, the packet counts return to nominal levels.

As shown in Scenario 1, the diagnosis latency of Adaptive DSD with symmetric forwarding is a linear function of the number of system nodes and can be significant for large systems. Scenario 2, shown in FIG. 11, illustrates the same experiment with asymmetric forwarding. The diagnosis latency is significantly reduced. The diagnosis latency for the failure is 60 seconds for asymmetric forwarding versus 400 seconds for symmetric forwarding. The same diagnostic information is forwarded, except that it is forwarded closer to the fault event. This results in a higher peak message count with shorter duration. The same total number of messages are forwarded, but they are forwarded throughout the network at a faster rate. The remaining experiment utilizes asymmetric forwarding to provide faster diagnosis latencies.

Scenario 3, shown in FIG. 12, illustrates two distributed simultaneous failures in the network, followed by simultaneous recoveries. FIG. 12 illustrates similar behavior as the single node failure, with the exception of higher average packet counts following the recovery. This occurs since the two recovered nodes each request complete diagnostic information from all of the nodes they initially test when they return to the network. For Scenario 3, the diagnosis latency of the failure is 50 seconds and the diagnosis latency of the recovery is 40 seconds.

FIG. 13 illustrates one advantage of Adaptive DSD over both of the SELF algorithms: the ability to correctly diagnose the state of a network under the presence of many faults. In Scenario 4, 50 of the 60 nodes experience simultaneous failures at 60 seconds. The average packet count initially reduces significantly since fifty nodes cease transmitting messages. The first faulty node is detected at 90 seconds, and the fault-free nodes attempt to reestablish a circuit among the remaining fault-free nodes. Following the first detected failure, a small subset of the remaining fault-free nodes re-establish a cycle in the test set. At this time, complete diagnostic information is forwarded among these nodes. At time 370, the cycle is increased to include all remaining fault-free nodes and additional diagnostic information is exchanged. After the 360 second diagnosis latency, the packet counts reduce to their new nominal values. At time 960, one of the fifty failed nodes returns to the network. The usual recovery detection occurs, and diagnostic information is exchanged. After only 90 seconds, complete diagnosis among the fault-free nodes is established.

Figure 14:
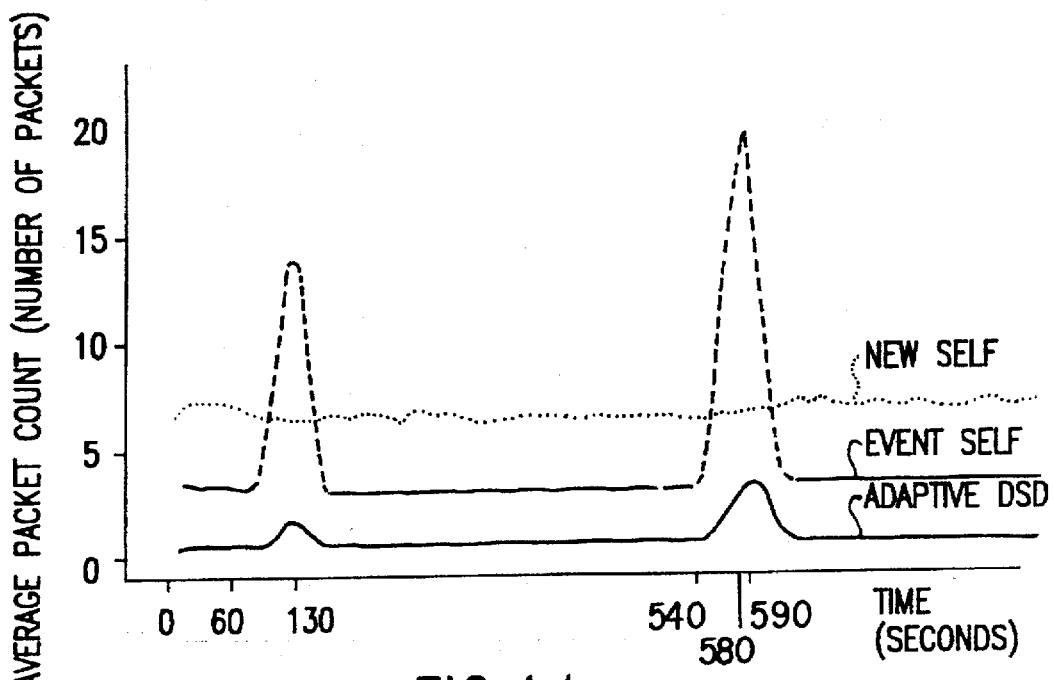
FIG. 14 is a graph depicting Scenario 5 on a 20-node testing network.
Figure 15:
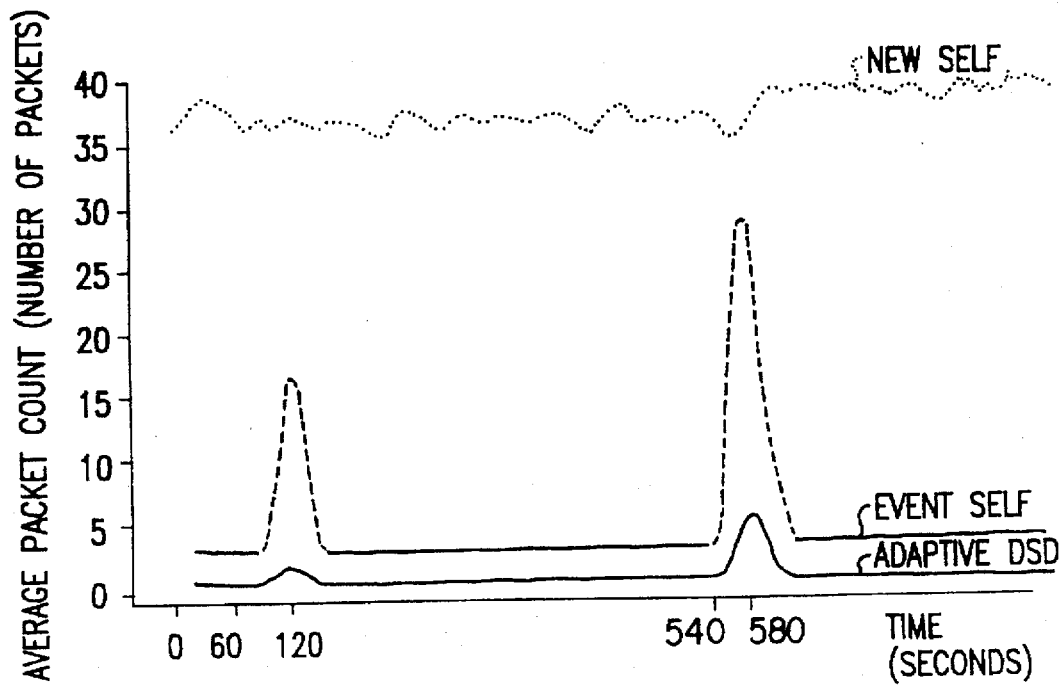
FIG. 15 is a graph depicting Scenario 6 on a 20-node testing network.

FIGS. 14 and 15 compare Adaptive DSD to the SELF algorithms for a single failure and subsequent recovery. Due to the high number of diagnostic messages generated by the NEW_SELF algorithm and the available network bandwidth, the diagnosis system is limited to twenty nodes. The algorithms executed in Scenario 5 shown in FIG. 14 use the same configuration parameters as the first three experiments: 30 second test interval, packet bundling, asymmetric forwarding, and a maximum of m=5 forward tests per test interval. Adaptive DSD has lower communication overhead and faster diagnosis latency. This is verified in Table 7.

Packet bundling is utilized in Scenarios 1 through 5 to reduce the total message count. Due to packet bundling, the packet counts do not reflect the actual number of diagnostic messages required by each algorithm. As shown in Table 6, the EVENT_SELF algorithm always requires fewer diagnostic messages than NEW_SELF. However, in FIG. 14, its average packet count exceeds that of NEW_SELF after a fault event. This occurs because EVENT_SELF forwards a single diagnostic message without bundling at each fault event. NEW_SELF only forwards the message concerning the event at the end of the next testing interval bundled with other diagnostic messages. To better illustrate the actual number of diagnostic messages, packet bundling is not utilized in Scenario 6. See FIG. 15. All other algorithm configuration parameters are maintained. As illustrated, Adaptive DSD requires fewer diagnostic messages than EVENT_SELF, which in turn requires fewer diagnostic messages than NEW_SELF. The message counts in FIG. 15 reflect those calculated in Table 6.

The Adaptive DSD algorithm has been specified and implemented. Adaptive DSD represents considerable improvements over previous distributed diagnosis algorithms. The algorithm is optimal in terms of the number of tests, requiring N tests in each testing interval. The diagnosability of the algorithm is maximum and permits the fault-free nodes to diagnose any of up to N−1 faulty nodes. In the Event Driven Adaptive DSD algorithm the total message count is NAf and optimal. Each node receives one message for each fault event in the system.

The initial Adaptive DSD algorithm suffers from increased diagnosis delay, in part due to the optimization of total message count. Correct diagnosis requires that algorithmic messages traverse a path that includes all fault-free nodes. The asymmetric Adaptive DSD algorithm permits a direct trade-off between message count and diagnosis delay. By specifying redundant paths for message forwarding, diagnosis delay is reduced at the expense of additional algorithmic messages. The asymmetric Adaptive DSD algorithm presented requires 1.5N4f messages and has a diagnosis delay of O(log2N).

Since its inception at Carnegie Mellon, greater reliance has been placed on the DSD system by the system administrators. The current system is used to diagnose faulty workstations within a minute of failure. In addition, the system has been used to determine the cause of failures during the presence of increased fault activity.

2. General Topological Diagnostic

In a second preferred embodiment, the Adapt algorithm performs distributed diagnosis in arbitrary networks where both node and link failures may exist. As with DSD, the testing assignments are adaptive in nature. However, in this embodiment the adaptive diagnosis operates in a general topological network to provide continuous on line diagnosis and handling of link failures.

The presently preferred embodiment of Adapt performs distributed diagnosis by formulating a local diagnosis of the entire system in each fault-free node of the system, based on results of tests it issues and diagnostic information it receives about nodes it does not test directly. The PMC fault model with periodic testing is assumed. A validation message is provided to ensure that diagnostic information received from faulty nodes is discarded.

The Adapt systems algorithm decomposes the testing assignment decision into two steps. In the first step, tests are added locally at each node to achieve strong connectivity of the testing graph. Correct diagnosis is guaranteed at completion of the first step. Execution occurs in parallel on the nodes to minimize diagnosis latency. In the second step, redundant tests are removed to reduce resources utilization while maintaining correct diagnosis. The algorithm diagnoses any number of nodes failures, provided that the graph of fault-free nodes remains connected. If the system is disconnected by node failures, correct diagnosis is achieved within each connected component.

††† A detailed performance analysis of Adapt is provided herein. During steady-state operation, the number of tests in the testing graph T(S) is shown to be bounded by $N \leq T(S) \leq 2(N-1)$. When a single node fails, the number of transient tests can be N2 or can remain as low as N tests. During the reconfiguration transient, no more than N additional packets are present, and persist for up to processing rounds. Transient packet count can be as low as one additional packet for $3(N-2)$ rounds. The diagnosis latency varies from N rounds in the best case, to $O(N2)$ under pathological conditions.

The Adapt diagnosis system, S, is modeled by a system graph, G(S), consisting of a set of vertices, or nodes, V(S), that are interconnected by a set of undirected edges, E(S) as defined above. In this embodiment, there is an edge $e_{ij}$ between nodes $n_i$ and $n_j$ in G(S) if there exists a communication path between the nodes in S. Nodes $n_i$ and $n_j$ are identified as neighbors and communicate with message packets sent on edge $e_{ij}$. The number of nodes in G(S) is N and the number of edges is E.

It is assumed that each node is capable of performing tests of its neighbors. The set of tests performed by all nodes is called the testing assignment and is represented by the testing graph, T(S). Arc $t_{ij}$ in T(S) represents a test of $n_j$ by $n_i$. The testing assignment is strongly connected, or disconnected, if there exists a directed path in T(S) from every node in T(S) to all other nodes.

A node is assigned a fault state, either fault-free (0) or faulty (1). The result of a test can be either fault-free (0) or faulty (1). The fault model indicates the expected test result given the fault state of the node performing the test and the node under test. Possible fault models include permanent faults on the PMC nodel, intermittent faults, and probabilistic faults. The PMC fault model is initially assumed.

The syndrome of system S is the collection of all test results. The set of fault states of all nodes in is referred to as the fault condition of S, and F(S) represents the set of all faulty nodes as defined above. Diagnosis is the mapping from the syndrome to the fault condition and is a function of the fault model.

The Adapt algorithm requires the following assumptions:

1. Link failures are not initially permitted.
2. The PMC, or "symmetric invalidation," fault model is assumed. Results of tests performed by fault-free nodes accurately reflect the state of the node under test, whereas the results of tests performed by faulty nodes are arbitrary.
3. Tests are periodic. A node may not fail and subsequently recover in an undetected fashion during the interval between two periodic tests by another node.
4. A message validation scheme is used to ensure that messages received from faulty nodes are discarded.

The primary structure required by the Adapt algorithm is the Syndromes array shown in FIG. 16(a). An entry in the array is maintained for all nodes and their associated test results. The timestamp is used to ensure that old syndrome information is overwritten by newer information. The entries in the node list are represented by <node id>/<fault state>. In FIG. 16, Syndromes [0] represents information source at node $n_0$ and contains 1/0, indicating that node $n_0$ is currently testing $n_1$ as fault-free. Syndromes [3] indicates that $n_3$ is currently testing $n_1$ as fault-free and $n_4$ as faulty. The x/x entry in Syndromes [4] indicates information that is arbitrary, since $n_4$ as faulty. The Syndromes array in FIG. 16(a) corresponds to the testing assignment shown in FIG. 16(b). The fields of the Syndromes array are accessed at node n by:

n. Syndromes [i].timestamp
n. Syndromes [i].notes
n. Syndromes [i].nodes [j].id
n. Syndromes [i].nodes [j].state Information is distributed in the network by exchanging packets between neighboring nodes. All packets used by Adapt have the same structure and contain the following fields:

p.Root: A field identifying the node that originated packet p.
p. Checked: A list of nodes that have processed the packet. Used to determine if all fault-free nodes have been visited.
p. Syndromes: A Syndromes array.

Additionally, each node n in the diagnosis system maintains the following local data structures:

n. Syndromes: The Syndromes array as perceived by node. The n. Syndromes[n] entry is controlled explicitly by information received from packets.
n. Root: Root node of the last packet processed by node n.
n. Father: Parent node in packet distribution tree. When n receives a packet for the first time, this records the immediate sender of that packet.
n. Local Timestamp: A local timestamp; used to ensure that new information sourced from this node overwrites older information stored Lt other nodes.

The Adapt system consists of three segments, or phases. The first phase occurs immediately after a fault vent. At that time Adapt enters the "Search" phase to reconstruct a strongly connected testing graph. Once a strongly connected testing graph is achieved, Adapt begins he "Destroy" phase, where redundant tests are removed. Finally, the "Inform" phase is invoked to update all nodes with the new testing assignment.

In the preferred embodiment a testing assignment is constructed such that there exists a directed path from any fault-free node to every other node. Adaptive testing is used to maintain a minimally strong (minimally strongly connected) testing graph in a dynamic environment where both node failures and repairs occur. The system is capable of diagnosing the state of every node in the network provided G[V-F] remains connected. If G[V-F] is disconnected, the fault-free nodes correctly diagnose all nodes in their connected component.

Adaptive testing assignment is determined locally using two procedures, Search and Destroy, which are executed during their corresponding phases.

```
/* Search; executed at n_x when a state change occurs in a
   tested node, or
*/
/* a Search Packet is received.
*/
Search()
{
1 for (all neighbors n_y)
1.1 if (n_y not reachable in testing graph)
1.1.1 add test of n_y;
2. propagate Search Packet;
}
/* Destroy: executed at n_x when a Search Packet completes,
   or */
/* a Destroy Packet is received.
*/
Destroy()
{
1.for (all neighbors n_y tested by n_x)
1.1 if (n_y reachable in (testing graph — test of n_y))
1.1.1 remove test of n_y;
2.propagate Destroy Packet;
}
```

When a node detects a change in state of any node it is testing, i.e., a failure or repair, it begins the Search phase. The nodes that detect the event run the Search procedure immediately and generate Search packets to propagate the new information. All other nodes execute the Search procedure at node n executes a digraph version of Dijktra's shortest path algorithm on the testing graph inferred from the Syndromes array.

If node n determines that there does not exist a directed path to any of its neighbors, tests of those neighbors are added and the n. Syndromes[n] entry updated accordingly. Once the Search procedure has executed at all nodes, the testing graph is guaranteed to be strongly connected. The Search procedure is set forth in the Appendix. The Search phase completes and diagnosis is achieved when a single Search packet completely traverses the network, indicating that all nodes have added local tests in parallel without regard to global constraints. The resulting testing graph is strongly connected, thus restoring correct diagnosis. The completion of a Search packet begins the Destroy phase of the algorithm.

During the Destroy phase, a single Destroy packet is circulated to all nodes in the network, causing each node to execute the Destroy procedure. The Destroy procedure (Appendix) executing at node n removes tests of neighboring nodes whenever test removal does not result in the loss of a directed path from n to any other node. Diagnosis is maintained during the Destroy phase, which results in a minimally strong testing graph.

When packets circulate in the network, they are forwarded using the Propagate procedure. The Propagate procedure (Appendix) performs a distributed depth-first search [1] of the system graph, and traverses a spanning tree of all fault free nodes in a connected component of G[V-F]. Packets traverse a distribution tree by recording their information at each node visited. Every node a packet passes through is said to belong to the tree being created by that packet, and the packet is said to be current at that node. Whenever packets are exchanged between nodes, a message validation scheme is assumed.

The Search procedure can execute on several nodes in parallel and still function correctly. The Destroy procedure, however, must run sequentially to ensure that a node does not remove tests another node requires for connectively. Parallelism can occur in the Search phase by the creation of multiple Search packets, i.e. when two or more nodes detect a fault event. However, a mechanism is needed to ensure that only one Destroy packet exists in the network at a given time. To arbitrate among multiple Search packets, an arbitration scheme called packet dominance is used. Packet dominance operates by comparing each newly received packet recorded as current at the node. Packets compete based on the age of the information in their Syndromes array. The following definition is utilized:

Packet Dominance. Given packets A and B, A dominates B (written A > B) if:
  ($\forall$i | A.Syndromes[i].timestamp >B.Syndromes.[i]. timestamp) or
  ($\forall$i | A.Syndromes[i].timestamp =B.Syndromes.[i]. timestamp) and (A.Root>B/Root).
A and B are said to be bidominant (written A<-> B) if
  ( $\exists$i | A.Syndromes[i].timestamp >B.Syndromes.[i]. timestamp)
and
  ( $\exists$i | B.Syndromes[i].timestamp > A.Syndromes.[i]. timestamp).
Otherwise, B dominates A (B>A).

If a dominant Search packet's arrival causes a node to add tests, then the node is considered to become bidominant with the packet. In this case, the amalgamation of the Search packet information plus the node information results in a new dominant Search packet (described under the collision rules below). If a node receives a packet that is of equal dominance to the one it has recorded as current, the packet is returning from a child node and is immediately propagated.

Packet A collides with packet B when A arrives at a node that has recorded B as current. The following rules are used to determine the outcome of such an event:

Collision Rules. Given Search packet A collides with packet B at node $n_x$:

if A>B, then A overwrites B, $n_x$ becomes part of A's tree, and $n_x$:

if A<B, then $n_x$ deletes packet A, and $n_x$ remains part of B's tree.

If A<->B, then $n_x$ forms a new packet C containing the newest information from both A and B, $n_x$ propagates C with C.Root=$n_x$ Packet A is deleted. Note that packet C>A,B by definition of dominance.

The dominance and collision rules ensure that if two or more Search packets are circulating in the network, exactly one Search packet completes. Hence, only one Destroy packet is created, ensuring that the Destroy procedure is executed sequentially.

For a Destroy or Inform packet, the collision rules are modified to ensure that the Destroy or Inform phase is abandoned if a new Search phase has begun. The only change required is that a Search packet is created if a Destroy or Inform packet is bidominant with the information stored at node nx. The dominance and collision rules form the basis for the procedures Receive Search Packet, Receive Destroy Packet, and Receive Inform Packet, set forth in the Appendix.

Periodic tests are used to identify faults and initially generate Search packets. The periodic testing procedure is set forth in the Appendix. At start-up, Search packets are circulated to construct an initial strongly connected testing graph. The Initialize procedure is set forth in the Appendix.

To identify the state of the remaining nodes in the network, a node executes the Diagnose procedure. Using the assumptions set forth above, a node can successfully identify other fault-free nodes it does not test directly by utilizing forward paths of fault free test results. For example, $n_x$ tests nodes $n_j$ and $n_k$ and determines $n_j$ to be fault-free and $n_k$ to be faulty. Since $n_x$ determines $n_k$ to be faulty, diagnostic information from $n_k$ is unreliable and cannot be utilized.

FIG. 17 depicts how the present invention performs a diagnosis. In this example the system and testing graphs are depicted in FIGS. 17(a) and 17(b), respectively. The system contains six nodes and a strongly connected initial testing graph. If $n_5$ fails, both $n_3$ and $n_4$ detect the failure and initiate the Search procedure. Since the testing graph is no longer strongly connected, both $n_3$ and $n_4$ add tests of $n_2$ in an attempt to reestablish directed paths to all nodes. Once these nodes have completed the Search procedure, both initiate a Search packet and send it to a fault-free neighbor, specifically $n_2$. Assume that $n_3$ Search packet arrives at $n_2$ before $n_4$'s Search packet. Since $n_3$ has updated its Syndromes array to reflect $n_5$,s failure, the search packet generated at $n_3$ dominates information stored it $n_2$ and causes the Search procedure to be invoked at $n_2$. Node $n_2$ executes the Search procedure, determines that it has a directed path to n5 through $n_4$ and does not add additional tests. This Search packet will continue to circulate until it collides witch another packet. No tests are added as a result of this packet.

After $n_2$ has processed $n_3$,s Search packet, $n_4$,s Search packet is received. Both $n_4$ and $n_2$ have new and different syndrome information. Thus, $n_4$,s Search packet is bidominant with the information stored at $n_2$ Node $n_2$ executes the Search procedure, and adds a test of $n_1$ to increase connectivity of the testing graph. A new Search packet is generated with the amalgamated information from $n_2$ and $n_4$, and is forwarded to $n_1$, which adds a test of $n_0$. No further tests are added at $n_0$ since the resulting test graph is strongly connected. The two remaining Search packets collide at a third node, with the dominant packet surviving. No new tests need to be added and the last Search packet completes its traversal of all fault-free nodes, signalling the end of the Search phase and restoring diagnosis. FIG. 18(a) illustrates the testing graph that results after performing the Search procedure at all nodes. The new testing graph is strongly connected on the fault-free nodes, $V(S-n_5)$ and thus diagnosis is restored.

After the Search phase ends, the Destroy phase begins at the node where the Search packet completes, assume $n_1$. Node $n_1$ executes the Destroy procedure, and determines that it has no redundant tests to remove. It creates a Destroy packet and forwards it to $n_2$. Node $n_2$ forwards the Destroy packet to both of its unvisited neighbors, $n_3$ and $n_4$, sequentially. Assume $n_4$ is the first to receive the Destroy packet from $n_2$. Node $n_4$ determines that its test of $n_5$ is redundant. The test is not required for connectivity since $n_4$ can reach $n_5$ from a directed path through $n_3$, which has no redundant tests to remove. The procedure continues until the Destroy packet visits all notes and returns to its originating node. FIG. 18(b) shows the testing graph after the Destroy phase completes. The resulting testing graph is minimally strong since no test can be removed while maintaining a strongly connected testing graph, Node $n_1$ then creates an Inform packet to distribute the new syndrome to all fault-free nodes. Once the Inform packet completes its traversal, the reconfiguration is complete.

Figure 19:
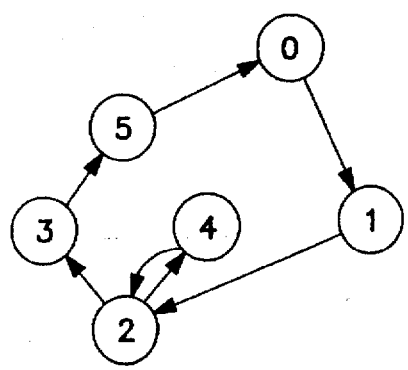
FIG. 19 shows the system graph for the network shown in FIG. 18 after node $n_5$ has been repaired.

In the case where $n_5$ is subsequently repaired. Nodes $n_3$ and $n_5$ both generate Search packets that attempt to traverse all fault-free nodes. Node $n_5$ initially tests $n_0$, determines that it has a directed path to all remaining nodes, and does not add any further tests. No tests are added by .any of the remaining fault-free nodes since the testing graph is already strongly connected. After the Search procedure has executed at all fault-free nodes, the Destroy procedure is initiated at a node, assume $n_3$. Node $n_3$ finds a directed path to $n_2$ through $n_5$, and can stop testing $n_2$ directly. It generates a Destroy packet and forwards it to $n_2$. A path through $n_3$ to $n_1$ indicates that $n_2$ does not have to test $n_1$. The test of $n_1$ is removed, and the Destroy packet is forwarded to $n_1$. This process is repeated until all fault-free nodes execute the Destroy procedure. The resulting testing graph, shown in FIG. 19, is minimally strong and differs from the initial testing graph shown in FIG. 17(b). After the Destroy packet has traversed all fault-free nodes, an Inform packet is generated and propagated to update all fault-free nodes of the reduced testing assignment.

Systems Performance

Figure 20:
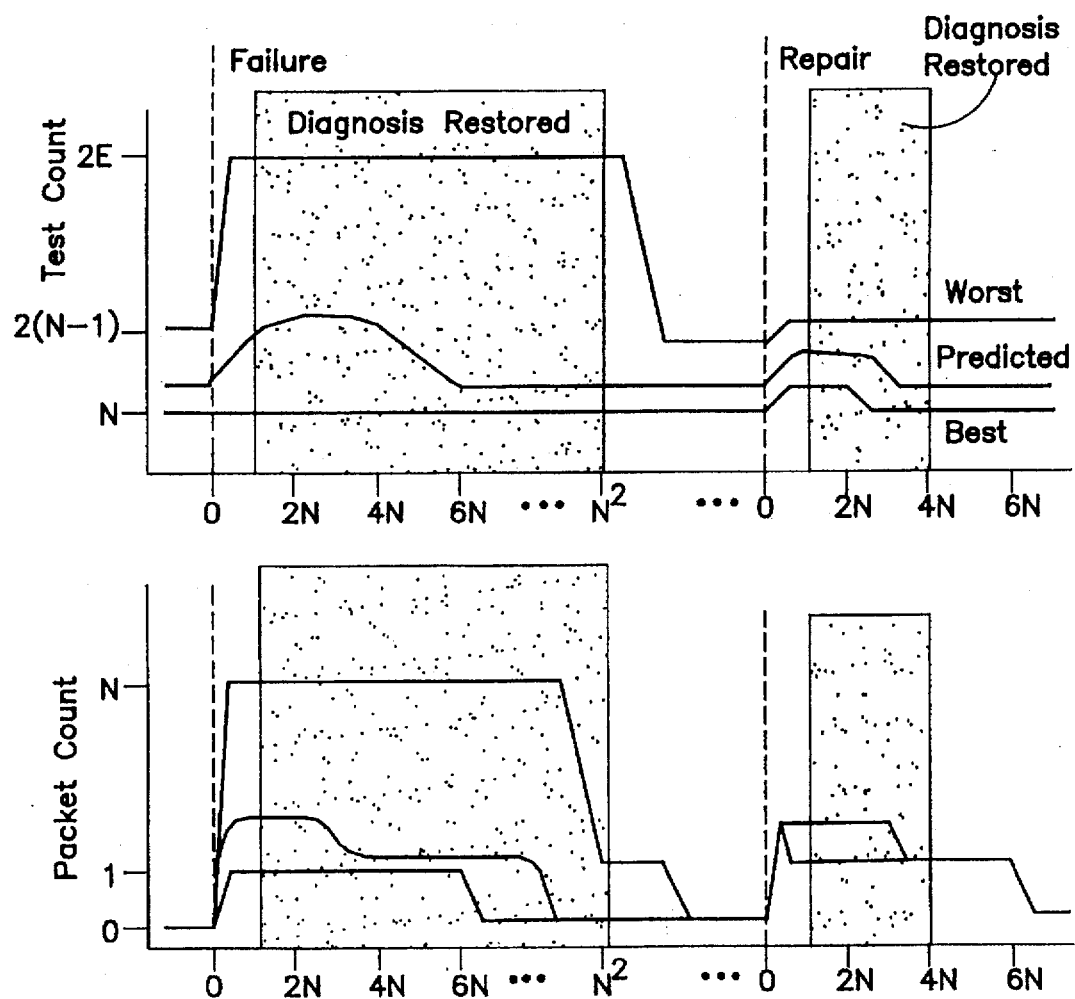
FIG. 20 illustrates best and worst case performance bounds for packet count, test count and diagnosis latency of Adapt shown in FIG. 16.
Figure 2L:
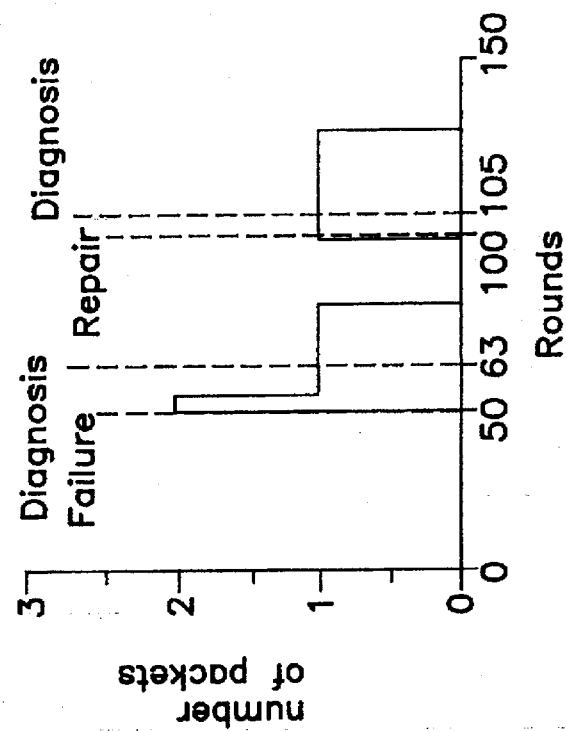
Figure 2L:
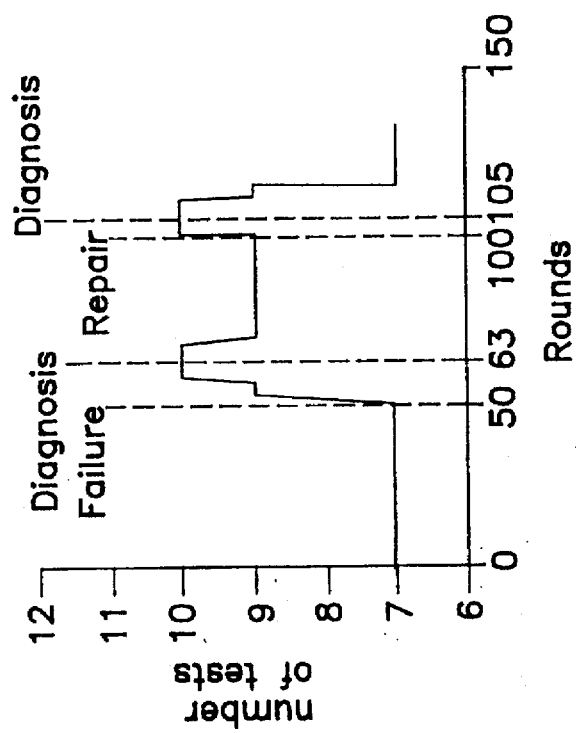
Figure 22B:
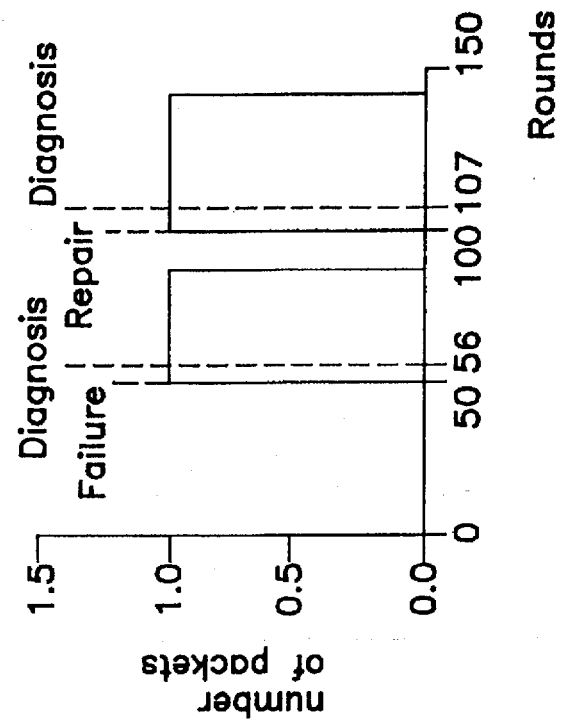
FIGS. 22(a)–(d) illustrate the upper and lower bounds of test message counts on two fully connected networks of eight nodes.
Figure 22A:
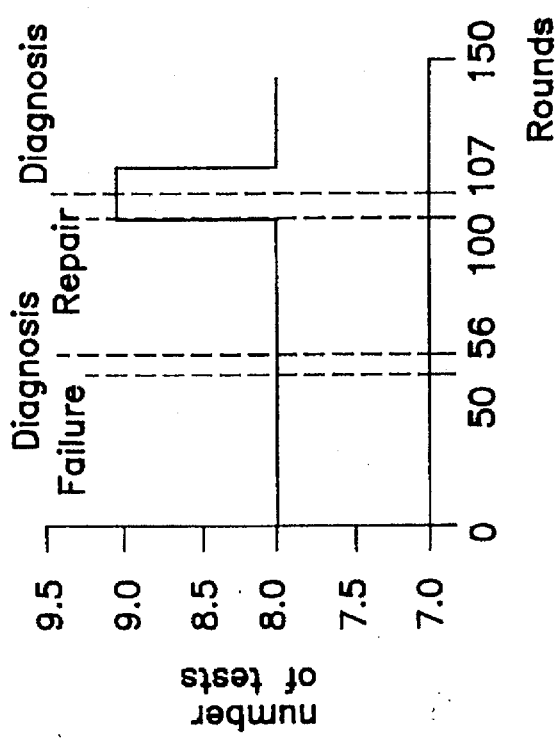
Figure 22D:
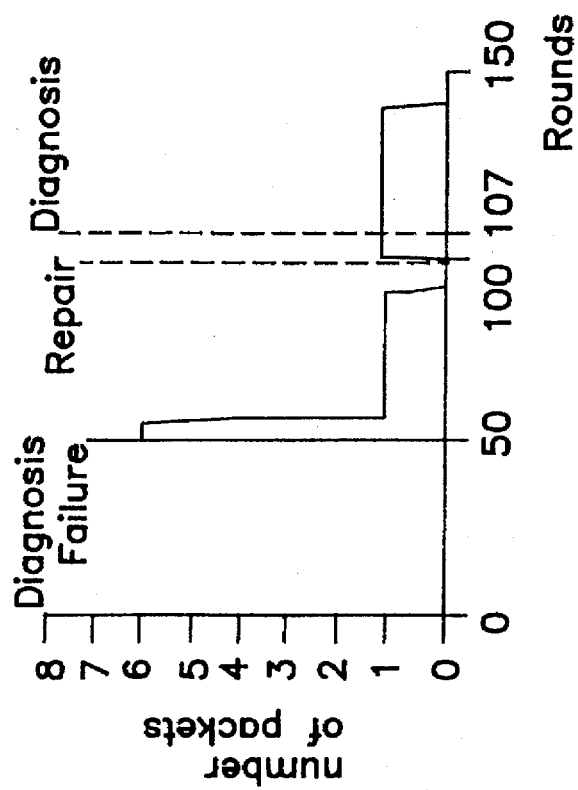
Figure 22C:
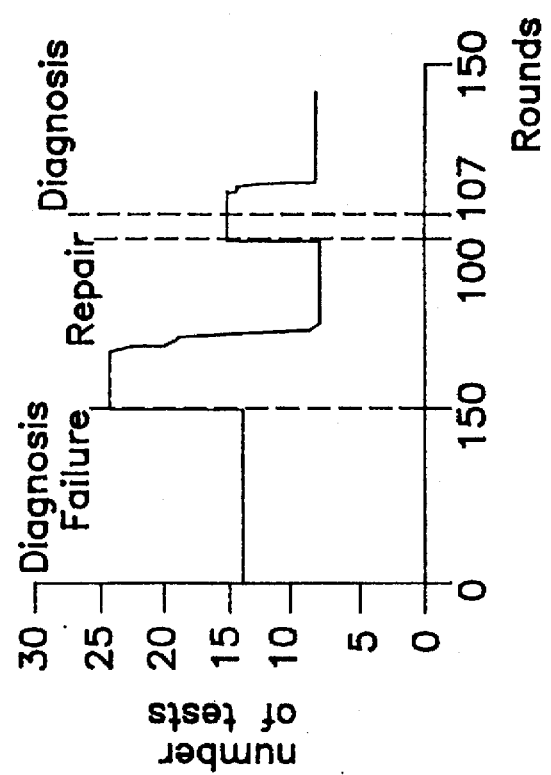
Figure 23A:
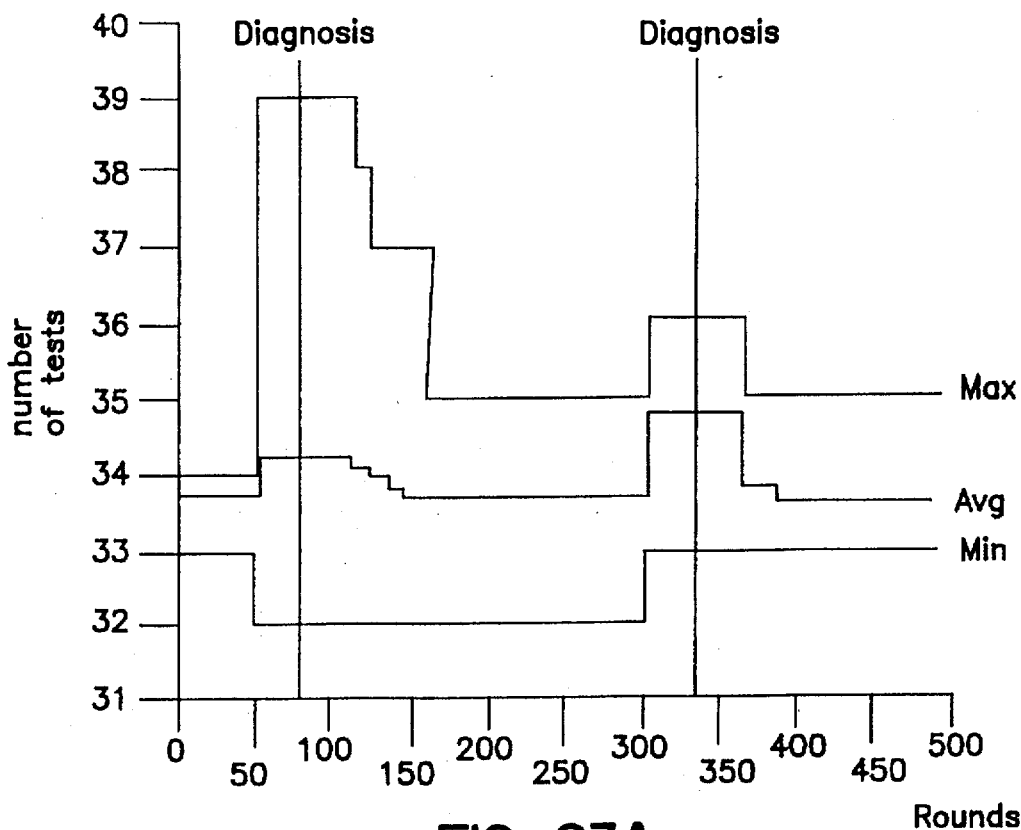
FIGS. 23(a)–(b) illustrate a hypercube network of 32 nodes.
Figure 23B:
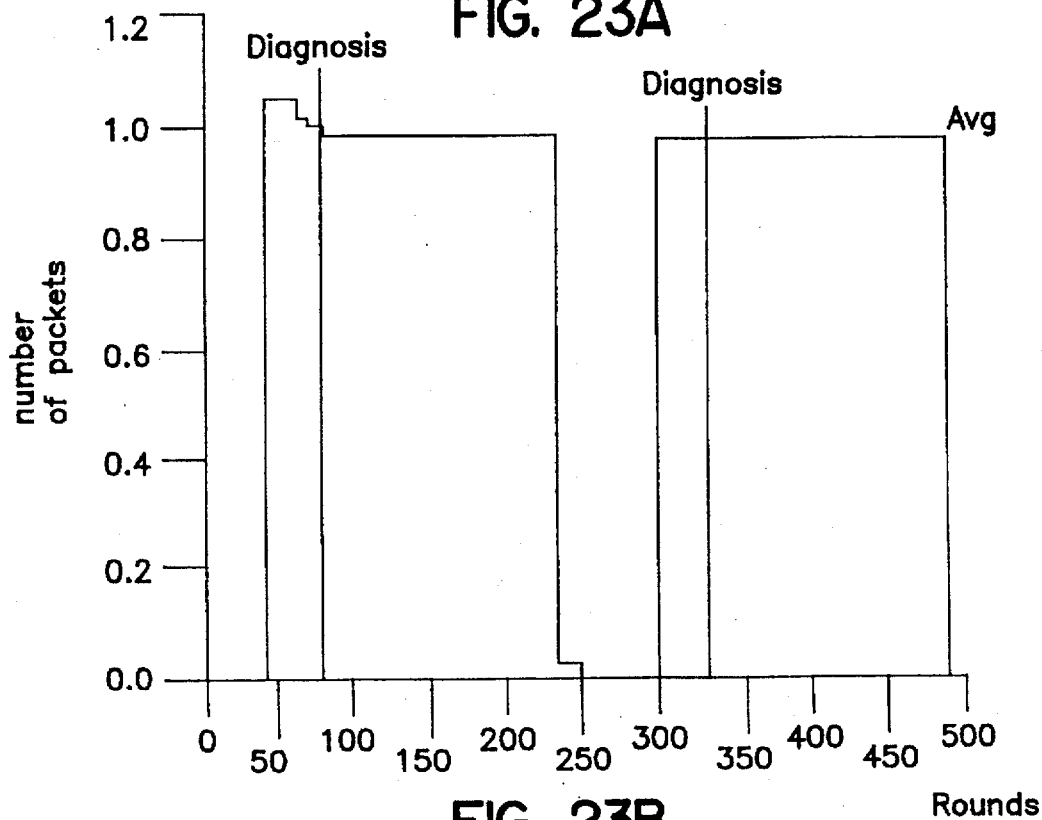
Figure 23C:
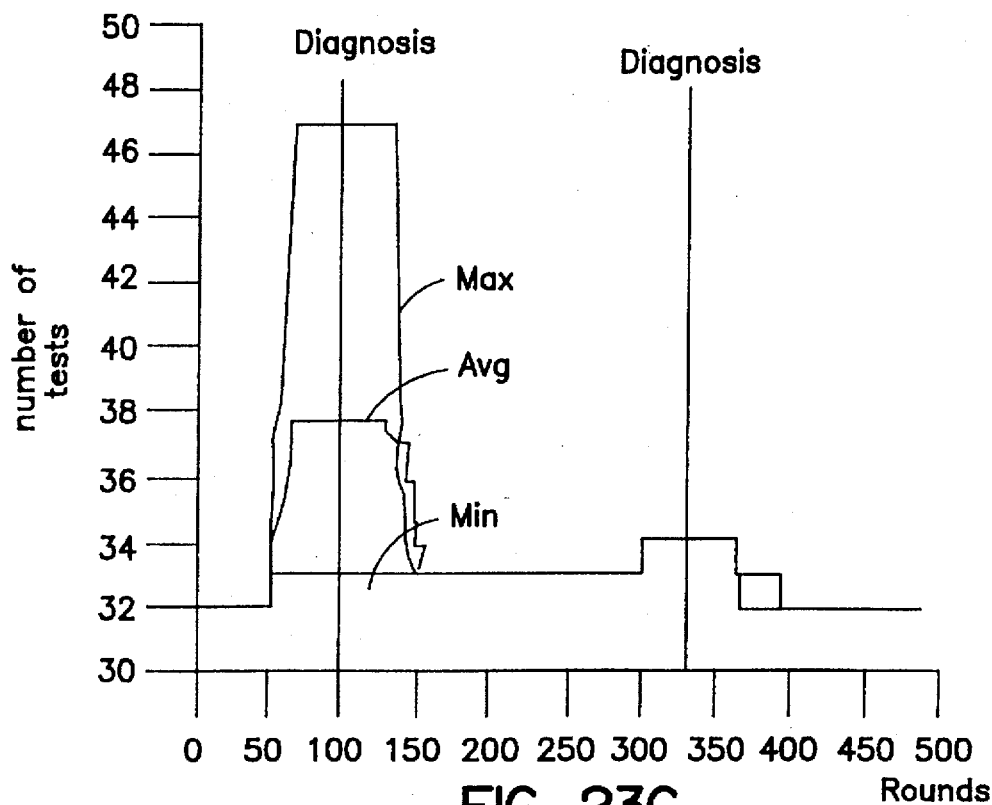
Figure 23D:
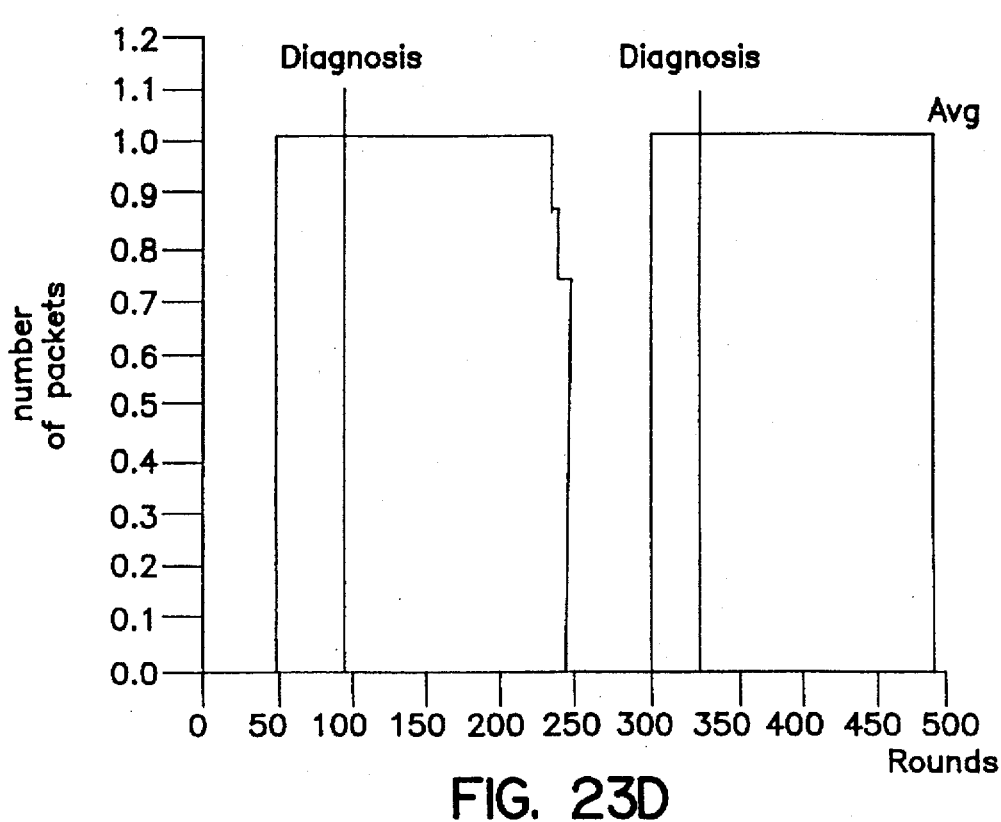
Figure 24A:
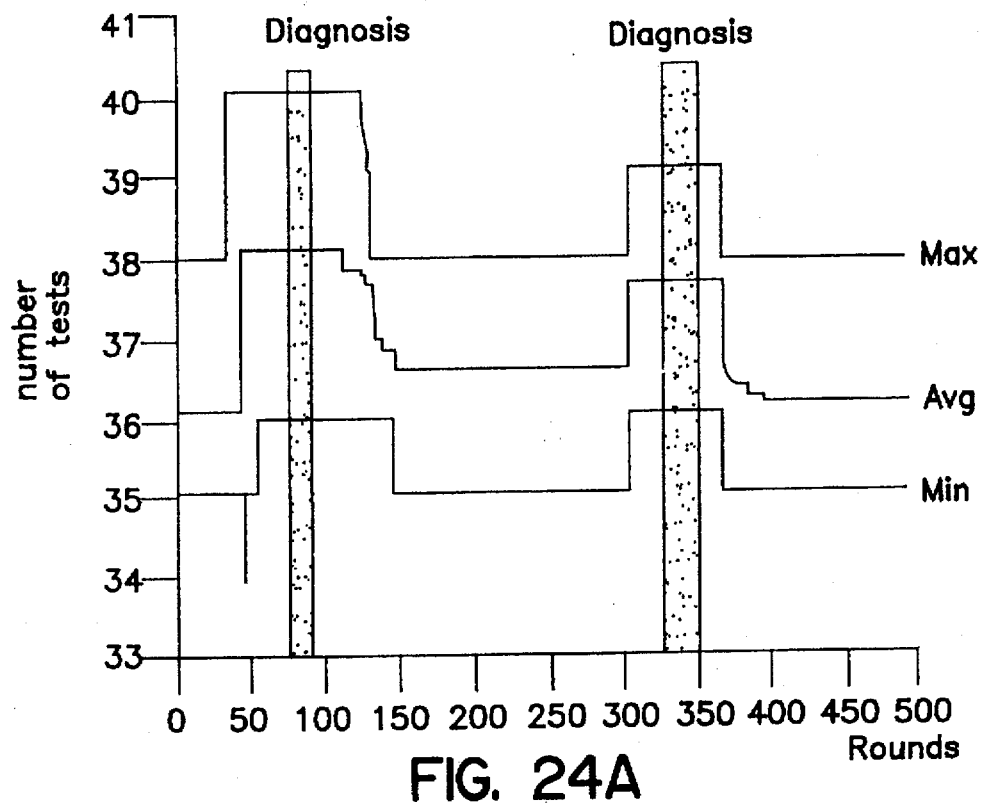
FIGS. 24(a)–(f) illustrate random irregular connected nodes of 310, 186 and 62.
Figure 24B:
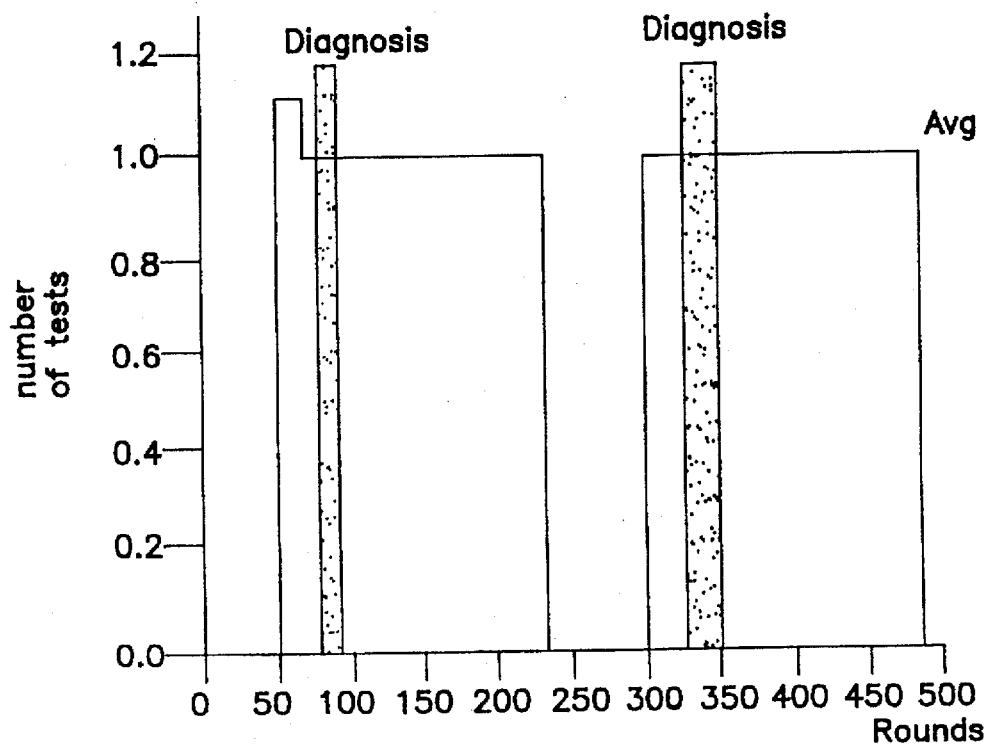
Figure 24C:
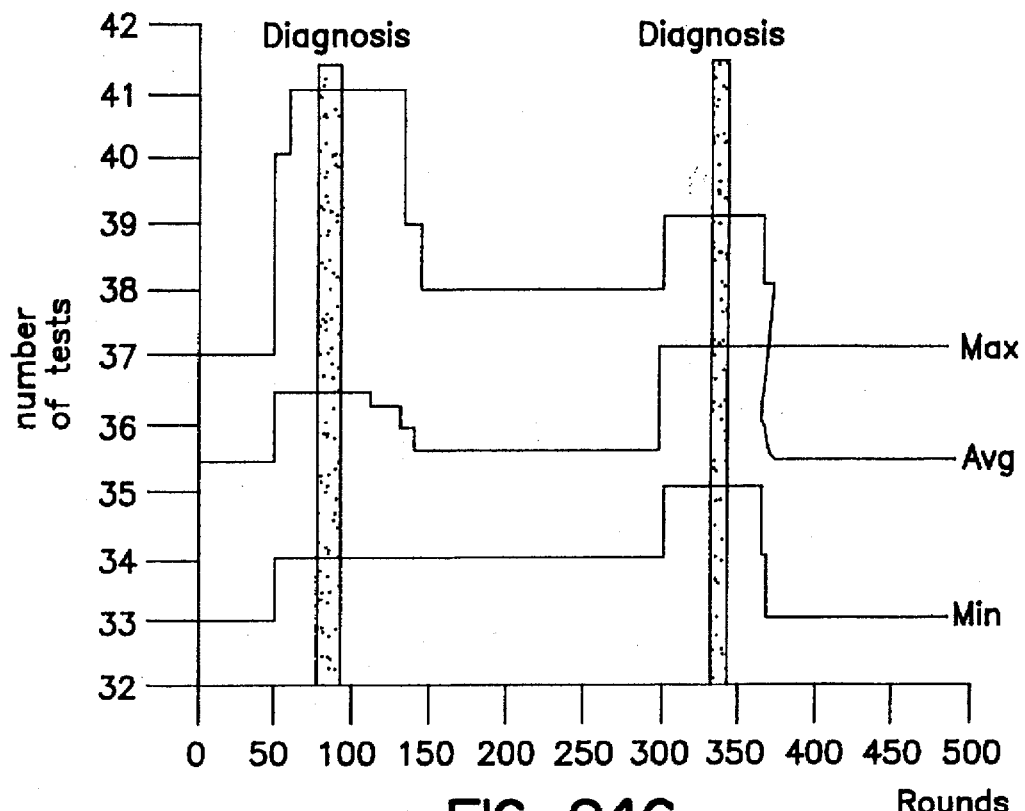
Figure 24D:
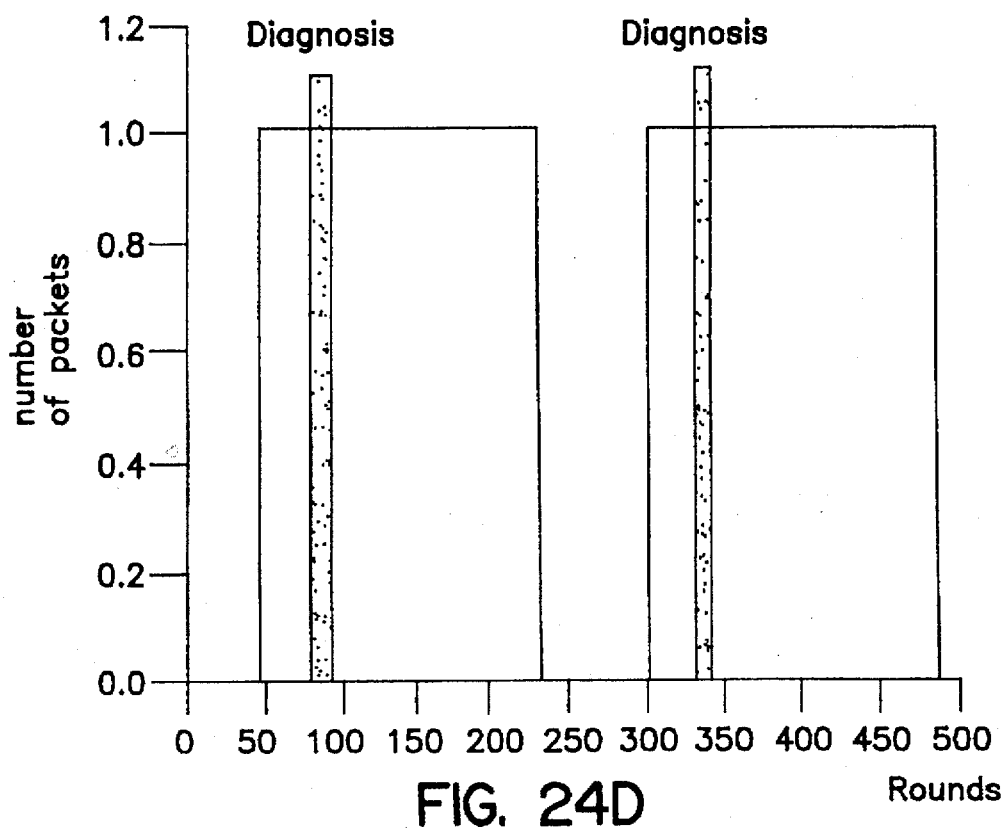
Figure 24E:
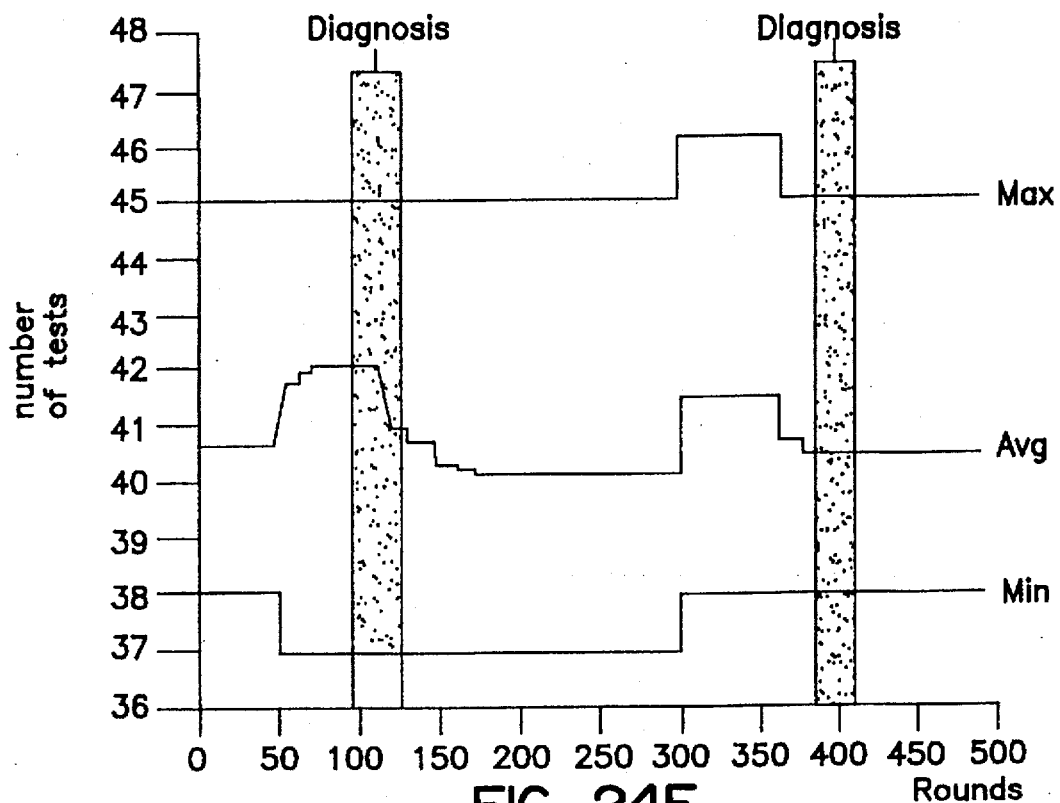
Figure 24F:
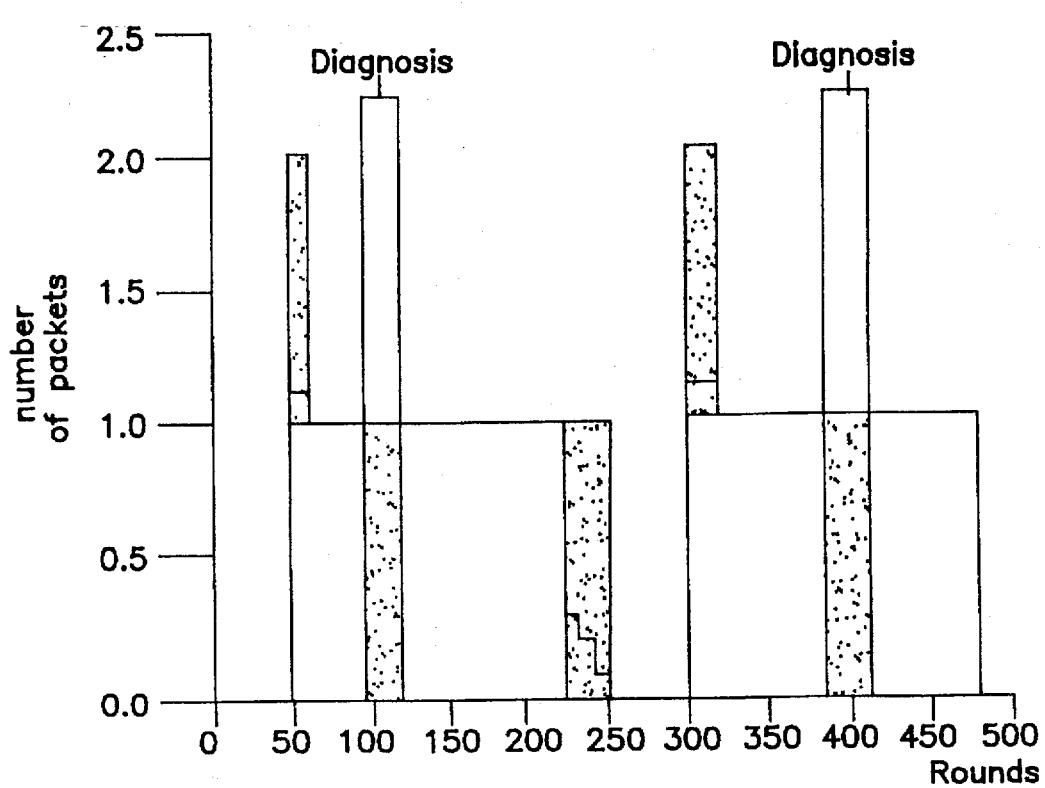

An analysis of the Adapt procedure is given in terms of its communication overhead, measured in number of packets, and diagnosis latency, measured in rounds. A round is defined as the time required to process a packet that is received by a node. Transmission time is assumed to be negligible. The procedure is evaluated by examining steady state and dynamic behavior. FIG. 20 illustrates the best and worst case performance bounds for packet count, test count, and diagnosis latency under both failure and repair.

During periods with no fault events, the testing assignment remains static and the only communication required is that for period tests. The number of tests in the testing assignment is limited to the number of arcs in a minimally strong connected graph, which is bounded by $N \leq T(S)| \leq 2(N-1)$. A testing assignment that requires N arcs is a directed Hamiltonian cycle, and a testing assignment requiring 2(N−1) arcs is a strongly connected spanning tree.

At fault event occurrence, transient packets are generated and the testing assignment changes dynamically to maintain strong connectivity. After a node failure, diagnosis is lost until a new strongly connected testing graph is created. Additional packets are required after restoring correct diagnosis to synchronize Search packets and reduce the testing assignment to minimally connected. After a node recovers, Search packets are started to indicate that the testing assignment is augmented and can potentially be reduced. Transient analysis is divided into three periods, Search, Destroy and Inform, or corresponding to the time during which each packet type is circulating in the network. Diagnosis is restored during the Search period.

In a preferred embodiment, if a single Search packet is generated after a node failure, in the best case it traverses the remaining N−1 nodes in as few as 2N−3 rounds. Destroy and Inform packets can each require as few rounds. As few as 3(2N−3) rounds are required in total. After a node recovers, each packet traverses at least one additional node, requiring 2N−1 rounds for each of the Search, Destroy and Inform phases. As few as 3(2N−1) rounds can be required for recovery.

The fewest number of tests required for diagnosis is N per periodic test interval. For node failure, if the node detecting the failure is able to reconnect the testing assignment with one additional test then the test count remains N. For node recovery, the recovered node adds at least one test, making the lowest test count N+1. The extra test persists until a Destroy packet is circulated, at which point the test count can be reduced to N.

For node failure, at least N-1 rounds are required to forward the correct syndrome to all nodes. For node recovery, at least N rounds are required.

For a single failure, at most one Search packet is created for each node testing the failed node. In the worst case, the Search procedure causes every node to add tests, generating N Search packets, and requiring $N^2$ testing rounds to propagate to all fault-free nodes. For p original Search packets, $O(N^2-p^2)$ rounds are required. For node recovery, two Search packets are generated, one by the recovered node and one by its tester. The packets collide after at most N-1 rounds, creating two other Search packets, of which one is dominant. The new packets collide after at most N-1 rounds, and the dominant packet completes in at most N-1 rounds. The worst case transient is 3(N-1) rounds. The worst case bounds are derived from highly contrived examples.

For node failure, the number of tests performed an theoretically increase to 2E. This happens in contrived circumstances, if the failed node is at the center of a star-connected testing graph, in a fully-connected network, and the algorithm execution time approaches zero. For node recovery, at most one test is added to the testing assignment.

Given the previous worst case execution, the diagnosis latency requires at most $O(N^2-p^2)$ rounds for node failure and 3(N-1) for recovery.

The procedure of this embodiment is easily modified to permit the testing graph to be reconfigured around failed links. The system diagnoses a link failure as a failed node. To ensure that a faulty test result is due to a failed node, other tests on links leading to the failed node must be performed. Link failures are not tested directly, but can be inferred from conflicting test results. The Search and Destroy procedures are modified to provide additional tests. The Search procedure executes at $n_x$, adding tests of neighbor $n_y$ if it cannot diagnose $n_y$ as fault-free. The Destroy procedure removes the test of $n_y$ only if $n_y$ is diagnosed as fault-free by another path in T(S).

The algorithm is implemented as multiple threads in the C programming language and consists of approximately 1000 lines of code. To ensure correct data collection, the threads are executed on a single workstation. The enhancement of the process by ordering nodes prior to execution is utilized where possible to reduce the number of tests in steady-state. Before executing the Adapt algorithm, a global ordering of the network nodes is created.

Process execution is shown in FIG. 21. Test count and total message count are given as a function of execution round. The network topology and initial testing assignment are shown in FIG. 17. The initial test and message counts are 7 and 0. Node $n_5$ is faulted during round 50, resulting in incorrect distributed diagnosis. Two Search packets are initiated during round 51. Within 2 rounds, the search packets collide and the dominant one continues to be forwarded in the network. By the 63rd, correct diagnosis is restored with 10 tests. The Search packet completes and a Destroy packet is initiated. One redundant test is removed during the Destroy phase, reducing the test count to 9. The Destroy and Inform phases complete and the message count returns to 0. The resulting testing assignment is given in FIG. 19. Node $n_5$ is faulted during round 100, resulting in the addition of 1 test to the testing assignment and the initiation of a search packet. The search packet returns to $n_5$ by round 105, resulting in correct diagnosis. The search packet completes and initiates a destroy packet that reduces the testing assignment to 7 tests. The final testing assignment is shown in FIG. 19.

FIG. 22 illustrates the upper and lower bounds of test and message counts for two examples in a fully connected network of eight nodes. FIG. 21(a–b) illustrates the lower bounds of the test and message counts.

The node ordering scheme is utilized to form a Hamiltonian cycle testing assignment. The graphs depict a single node failure and subsequent repair. The test count is 8 and minimum except for a short transient period during node repair. A single search packet is generated for both failure and repair events. Diagnosis latency is maximum, since the search packets must traverse the cycle before completing. FIG. 22(c–d) illustrates the upper bounds of the test and message counts. The initial testing assignment is a star network, requiring 14 tests. All nodes test $n_1$ and $n_1$ tests all other nodes. Node $n_1$ is failed at 50 rounds, resulting in the initiation of the maximum 7 search packets, one at each of the remaining nodes. Diagnosis occurs immediately, since the search packets operate in parallel on all fault-free nodes. The search packets must collide within 1 round and quickly reduce to a single dominant packet that completes. The resulting testing assignment requires 8 tests. Node $n_1$ is repaired at 100 rounds and algorithm execution occurs as above.

A single node failure and repair sequence is illustrated on other regular networks in FIG. 23. FIG. 23(a–b) illustrates a hypercube network of 32 nodes and FIG. 23(c–d) illustrates a torus of 32 nodes. The figures represent 10 instances of different node failure and repair sequences. The minimum, maximum and average test and message counts are shown. Message counts are typically 1 since either 1 search packet is initiated, or search packet collision occurs within a few rounds. Also, transient test count is well below the 2E maximum.

Referring to FIG. 24, random irregularly connected graphs are shown with 32 nodes and 310, 186, and 62 links. For each case, 10 experiments of a single node failure at 50 rounds and repair at 300 rounds is shown. Average diagnosis latency is shown by a vertical line, with the shaded region identifying minimum and maximum diagnosis latency. The relatively highly connected graphs of FIG. 24(a–b) and FIG. 24(c–d) perform similar to the fully connected graph, with low test and message counts. Test counts remain within 4 tests during steady state and typically 1 search packet is initiated, since only 1 node is testing the filled node. This occurs since high connectivity permits the algorithm to reduce test counts by forming sub-cycles within the testing assignment. The random graphs illustrated in FIG. 24(e–f) have low connectivity, forcing irregular testing assignments. This results in greater differences between minimum and maximum test counts and the number of search packets initiated. The diagnosis latency is also increased, due to the reduced number of paths available for packet forwarding.

Figure 25A:
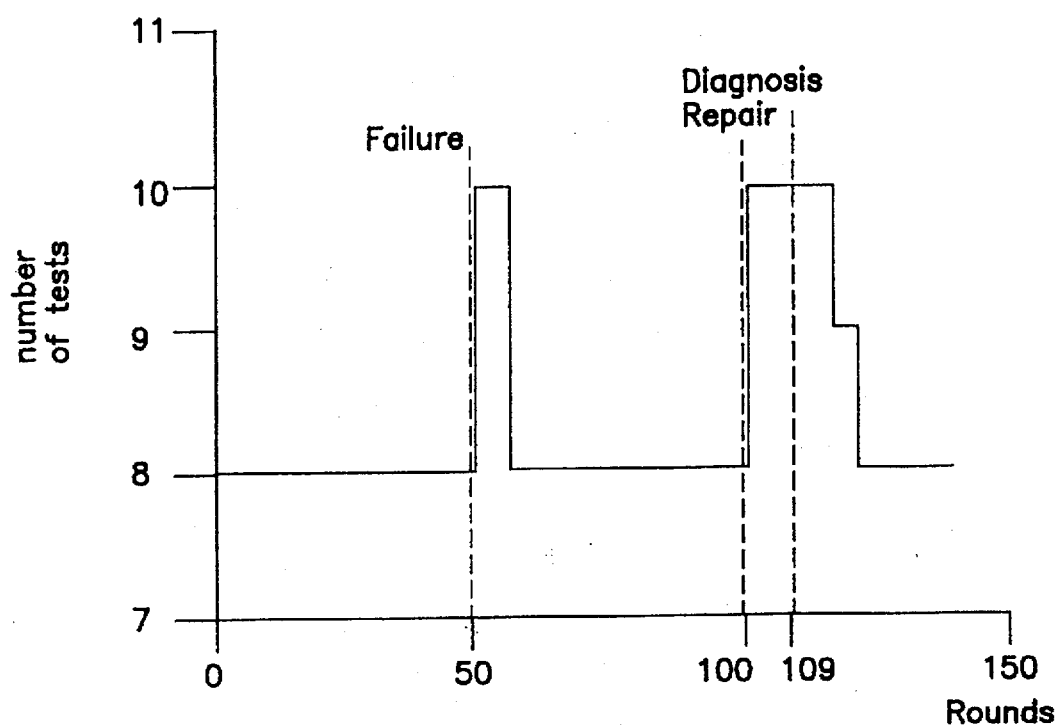
FIG. 25 illustrates a disconnected network of eight nodes and eight edges.
Figure 25B:
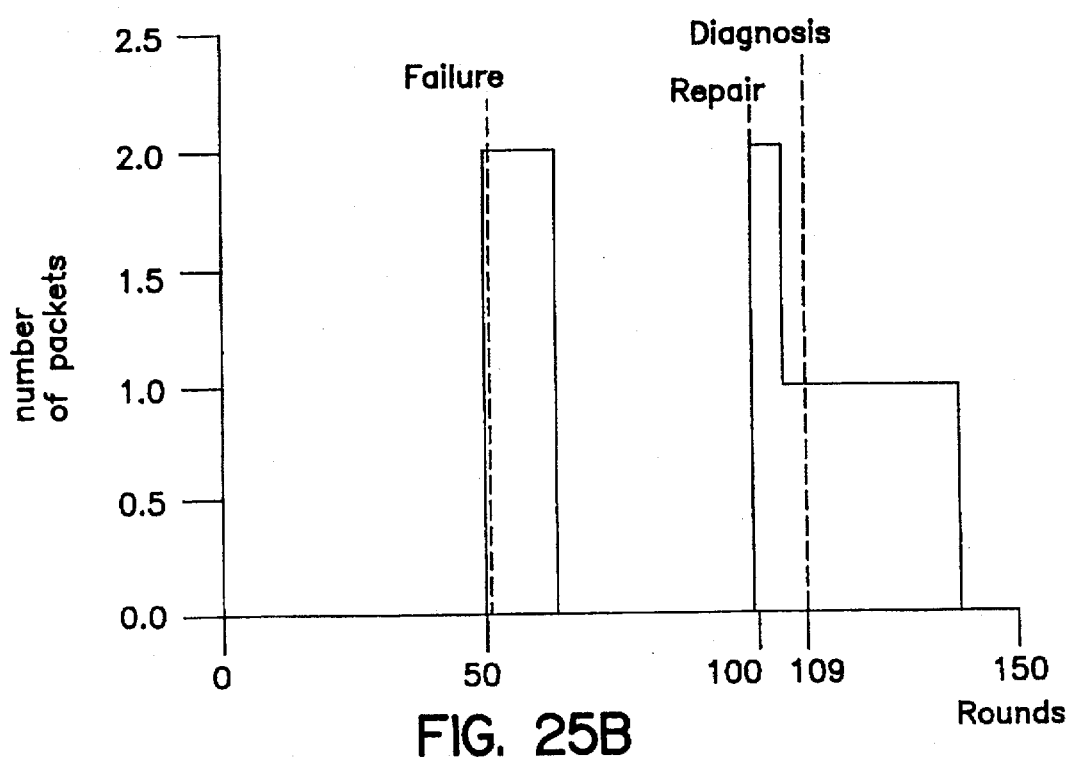

A disconnected network example is given in FIG. 25. The network consists of 8 nodes and 8 edges. A failed node partitions the network into 2 disconnected components at 50 rounds and is subsequently repaired at 100 rounds. Normal algorithm execution occurs except that diagnosis is not reached after the node failure. When the node fails, two search packets are initiated, one in each disconnected component. The nodes in each component correctly diagnose the nodes in their component as fault-free, but cannot diagnose the nodes in the other component. The algorithm can identify the partition and can identify the fault state of the nodes in the other component as unknown. When the node is repaired, a search packet is initiated in each connected component. Eventually, the search packets collide, since the network is connected, and correct diagnosis is determined.

Implementation results show performance parameters are typically at or near best case. The worst case transient test count is 2E for a failed node. This occurs if the failed node disconnects the testing graph into N−1 components, of one node each, and all remaining fault-free nodes initiate Search packets simultaneously by testing all other nodes, such as the star testing graph example. In practice, transient test count remains close to N and only exceeded 2N in the star testing graph example. Even in that example, the number of tests never exceeded 3N, since all nodes do not initiate Search packets simultaneously, and the slower nodes utilized test results performed by the faster nodes. In addition, the worst case transient packet count can equal at most N. However, in practice the transient packet count only exceeded 2 in the star testing graph example.

Appendix

Search Procedure

```
/* Invoked by Periodic Test Nodes, Receive Search
       Packet, or Initialize procedures */
Procedure Search (n.Syndromes,n.Neighbors)
Begin
       reachable = run directed Dijkstra's algorithm on
       n.Syndromes;
       while ( x ∈ n.Neighbors l c x ∈ reachable) do begin
       test node x, requesting x.Syndromes; add test result
       to n.Syndromes[n]; n.Local_Timestamp =
       n.Local_Timestamp + 1; if (x.Test_Result = fault-
       free) then begin il x.Syndromes[i].timestamp >
       n.Syndromes[i].timestamp) do
       begin /* update local Syndromes array with any newer
       information */
              n.Syndromes[i] = x.Syndromes[i];
              if (x.Syndromes[n].timestamp >
              n.Local_Timestamp)
                     then begin
                     n.Local_Timestamp =
                     x.Syndromes[n].timestamp
                         + 1;
                     n.Syndromes[n].timestamp =
                     Local_Timestamp;
              end
       reachable = run directed Dijkstra's
       algorithm
              on n.Syndromes;
              end
       end
END
```

Destroy Procedure

```
/* Invoked by Receive Destroy Packet procedure */
Procedure Destroy(n.Syndromes)
Begin
       reachable = run directed Dijkstra's algorithm on
       n.Syndromes;
       v ∈ n.Syndromes[n].nodes do begin
              new_reachable = run directed Dijkstra's
              algorithm
                     on n.Syndromes with test of x removed;
              if (reachable = new reachable) then begin
              /* Remove test of x, update local Syndromes
                     entry */
              n.Syndromes[n].nodes = n.Syndromes[n].nodes
              − x;
```

Appendix -continued

```
              n.Local_Timestamp ++;
              n.Syndromes[n].timestamp =
              n.Local_Timestamp;
       end
       end
End
```

Propagate Procedure

```
/* Invoked at node n to propagate a packet p through the
       network. */
Procedure Propagate(p.Syndromes, p.Checked, p.Root,
p.Sender,
       n.Neighbors)
Begin
       Complete = false;
       n.Root = p.Root;
       if (n ∈ p.Checked) then begin
              add n to p.Checked;
              n.Father = p.Sender;
       end
              if (   x, x∈ n.Neighbors l x
              p.Checked) then /* send to a child
              node */
                     send (p.Syndromes, p.Checked,
                     p.Root, n) to x;
              else /* there are no neighbors to send the
              packet to */
                     if (p.Root = n) then
                            Complete = true;
                     else /* Packet on its return trip, Send it
                     to our father. */
                            send (p.Syndromes, p.Checked, p.Root,
                            n) to n.Father;
              end
       end
End
```

Receive Search Packet

```
/* Invoked whenever node n receives a Search Packet from
Sender */
Procedure Receive Search Packet (s.Syndromes, s.Checked,
sRoot,
       s.Sender)
Begin
       if (   ils.Syndromes[i] .timestamp >
       n.Syndromes[i] .timestamp)
              then
              /* Search Packet is either dominant or
              bidominant */
              ils.Syndromes[i].timestamp >
              n.Syndromes[i].timestamp do begin
                     n.Syndromes[i] = s.Syndromes[i];
              end
              Search (n.Syndromes, n.Neighbors);
              if (   iln.Syndromes[i].timestamp >
                     s.Syndromes[i].timestamp) then
                            /* packet is bidominant, restart
                            search packet
                                   with newest information and
                                   node n as root */
                            s.Syndromes = n.Syndromes; s.Checked =
                            n;
                            s.Root = n; s.Sender=∮
                            Propagate (s.Syndromes, s.Checked,
                            s.Root,
                                   s.Sender, n.Neighbors);
              else /* packet is dominant (and no tests
                     added by Search)*A/
                            Propagate (s.Syndromes, s.Checked
                                   s.Root, s.Sender,
                                   n.Neighbors);
              end
       else if (   ils.Syndromes[i].timestamp
              = n.Syndromes.timestamp) then
              /* equivalent packet, must use Root node to
                     determine dominance */
              if (n ∈s.Checked) then /* packet is
                     returning from a child node */
```

Appendix

```
                if (s.Root = n.Root) then
                    Propagate (s.Syndromes,
                        s.Checked, s.Root,
                        s.Sender, n.Neighbors);
                else if (s.Root > n.Root) then
                    /* packet is dominant */
                    Propagate (s.Syndromes, s.Checked,
                        s.Root, s.Sender, n.Neighbors)
            end
    end
    if Propagate procedure set Complete - TRUE then
        Begin Destroy Phase;
End
Receive Destroy Packet /*  Invoked whenever node n receives a Destroy Packet from
    Sender */
Procedure Receive Destroy Packet (d.Syndromes, d.Checked,
d.Root,
        d.Sender)
Begin
    if (  i!n.Syndromes[i].timestamp >
    d.Syndromes[i].timestamp)
        then
            /* node n is dominant or bidominant to d,
            so abort
            Destroy phase */
            if (   i!d.Syndromes[i].timestamp >
                n.Syndromes[i] .timestamp) then
                /* n and d are bidominant, update
                entries.
                    Create s, new search packet */
                    i!d.Syndromes,[i] .timestamp >
                    n.Syndromes[i] .timestamp do
                        n. Syndromes[i] =
                        d. Syndromes[i];
                    s.Syndromes = n.Syndromes;
                    s.Checked = n; s.Root = n;
                    s.Sender =∅
                    Propagate (s.Syndromes, s.Checked,
                        s.Root, s.Sender, n.Neighbors);
                    if Propagate procedure set Complete =
                        TRUE
                        then
                            Begin Destroy Phase;
                    end
            else /* packet is dominant, update node. */
                i!d.Syndromes[i] .timestamp >
                n.Syndromes[i] .timestamp
                    do
                        n.Syndromes[i] = d.Syndromes[i];
                        if (n ∉ p.Checked) then
                            Destroy (n.Syndromes);
                            d.Syndromes = n.Syndromes;
                    end
                Propagate (d.Syndromes, d.Checked, d.Root,
                d.Sender,
                    n.Neighbors);
                if Propagate procedure set Complete = TRUE then
                    Begin Inform Phase;
                end
        end
End
Receive Inform Packet /*  Invoked whenever node n receives an Inform Packet from
    Sender */
Procedure Receive Inform Packet (iSyndromes, i.Checked,
i.Root,
        i.Sender)
Begin
    if (   j!n.Syndromes[j] .timestamp >
    i.Syndromes[j] .timestamp)
        then
            /* n is dominant or bidominant with i,
            abort inform */
            if (   j!i.Syndromes[j] .timestamp >
                n.Syndromes[j] .timestamp) then
```

Appendix

```
                /* n and i are bidominant, update
                entries.
                    Create new search packet s */
                    j!i.Syndromes[j] .timestamp >
                n.Syndromes[j] .timestamp then
                    n.Syndromes[j] = i.Syndromes[j];
                s.Syndromes = n.Syndromes; s.Checked =
                n;
                    s.Root = n; s.Sender =∅
                Propagate (s.Syndromes, s.Checked,
                    s.Root, s.Sender, n.Neighbors);
                if Propagate procedure set Complete =
                TRUE
                    then
                        Begin Destroy Phase;
                end
        else /* i is dominate over n, update n.Syndromes and
            propagate i */
                j!i.Syndromes[j] .timestamp >
            n.Syndromes[j] .timestamp
                then
                    n.Syndromes[j] = i.Syndromes[j];
            Propagate (i.Syndromes, i.Checked, i.Root,
            i.Sender,
                n.Neighbors)
            end
END
Periodic Test Nodes /* Invoked once per testing period */
Procedure Periodic Test (n.Syndromes, n.Neighbors)
Begin
        x ∈ n.Syndromes[n] .nodes do begin
        test node x,
        if(x.Test_Result ≠
        n.Syndromes[n] nodes[x] state)
            then
                /* node has changed state, update Syndromes
                entry */
                n.Syndromes[n] .nodes[x] .state =
                x.Test_Result;
                set flag Start_Search;
        end
    end
    if Start_Search then /* Begin Search phase, create a
        Search packet */
            Search (n.Syndromes, n.Neighbors);
            Local_Timestamp ++;
            n.Syndromes[n] .timestamp = Local_Timestamp;
            s.Syndromes n.Syndromes; s.Checked = n;
            s.Root =n;
                s.Sender =∅;
            Propagate (s.Syndromes, s.Checked, s.Root,
            s.Sender,
                n.Neighbors);
            if Propagate procedure set Complete = TRUE
                then Begin Destroy Phase;
    end
End
Initialize Procedure /* Invoked once at start-up */
Procedure Initialize
Begin
    i ∈ V(S) do
        n.Syndromes.[i] .nodes =∅
    Search (n.Syndromes, n.Neighbors);
    /* Create new Search Packet */
    s.Syndromes = n.Syndromes; s.Checked = n; s.Root = n;
        s.Sender =∅
        Propagate (s.Syndromes, s.Checked, s.Root,
            s.Sender, n.Neighbors);
End
Diagnose Procedure /* Executed at a fault-free node n each time it desires a
    diagnosis of the system. */
Procedure Diagnose (n.Syndromes)
```

-continued

Appendix

```
Begin
    ∀i   V(S) do begin
        n.Visited[x_i] = false;
        n.Diagnosis[x_i] = faulty;
    end
    Traverse (n.Syndromes, n.Visited, n.Diagnosis,n);
End
/*Invoked recursively to perform a depth-first search for
all
    fault-free nodes. */
Procedure Travers (n.Syndromes, n.Visited, n.Diagnosis,
    originator);
Begin
    v ∈
    n.Syndromes[originator]
    .nodesIn.Syndromes[originator] .nodes[v] .st
    = fault-free do
        if (!n.Visited[v]) then
            n.Visited[v] = true;
            n.Diagnosis[v] = fault-free;
            Traverse (n.Syndromes, n.Visited,
                n.Diagnosis.v);
        end
    end
END
```

While presently preferred embodiments of the invention have been shown and described in detail, the invention may be otherwise embodied within the scope of the appended claim.

What is claimed is:

1. A method for obtaining system diagnostic information via determining a state of each node in a network having nodes interconnected by communication links, the method comprising a search phase and a destroy phase, the search phase commencing upon a change of state in a node or link being tested and terminating when a message packet traverses the network indicating that all nodes have executed the search phase and the destroy phase commencing upon completion of the search phase to eliminate redundant tests.

2. The method of claim 1 further comprising an inform phase commencing upon completion of the destroy phase to update all nodes with a new testing assignment.

3. The method of claim 1 wherein the state is either fault free or faulty, and wherein a faulty state is due to at least one of the following: permanent faults, PMC model faults, intermittent faults and probabilistic faults.

* * * * *